US007724266B2

(12) United States Patent
Aizawa et al.

(10) Patent No.: US 7,724,266 B2
(45) Date of Patent: May 25, 2010

(54) IMAGE DISPLAY ADJUSTING DEVICE

(75) Inventors: Hiroki Aizawa, Kanagawa (JP); Minoru Yoneda, Kanagawa (JP); Toshimasa Otsuki, Saitama (JP); Kazuhiko Yamauchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 873 days.

(21) Appl. No.: 11/556,431

(22) Filed: Nov. 3, 2006

(65) Prior Publication Data

US 2007/0103492 A1 May 10, 2007

(30) Foreign Application Priority Data

Nov. 7, 2005 (JP) ............................ 2005-322439

(51) Int. Cl.
*G06K 9/36* (2006.01)
*G06K 9/40* (2006.01)
*G09G 5/00* (2006.01)
*G06F 17/00* (2006.01)
*G06T 1/00* (2006.01)

(52) U.S. Cl. ........................ 345/619; 345/204; 345/418

(58) Field of Classification Search ........... 345/55-108, 345/204-214, 418, 600-698; 382/236, 261
See application file for complete search history.

(56) References Cited

U.S. PATENT DOCUMENTS

| | | | | |
|---|---|---|---|---|
| 6,281,873 | B1 * | 8/2001 | Oakley | 345/418 |
| 6,362,831 | B1 * | 3/2002 | Shyu | 345/600 |
| 7,006,148 | B2 * | 2/2006 | Nagata | 348/448 |
| 2004/0201564 | A1 | 10/2004 | Sugino et al. | |
| 2005/0008078 | A1 | 1/2005 | Kurumisawa | |
| 2005/0068343 | A1 * | 3/2005 | Pan et al. | 345/690 |
| 2005/0190301 | A1 * | 9/2005 | Aida et al. | 382/266 |
| 2005/0253833 | A1 | 11/2005 | Teshirogi et al. | |

FOREIGN PATENT DOCUMENTS

| | | |
|---|---|---|
| JP | 7-20828 | 1/1995 |
| JP | 2005-173525 | 6/2005 |

* cited by examiner

*Primary Examiner*—David L Lewis
(74) *Attorney, Agent, or Firm*—Oblon, Spivak, McClelland, Maier & Neustadt, L.L.P.

(57) ABSTRACT

An image display adjusting device wherein a difference portion obtains a difference between an input signal f0 preceding by one frame as an input signal f1 held by one frame by a memory portion and a current input signal f1, a multiplication portion 106 multiplies this difference signal (f1−f0) by a highlight coefficient α, and an addition portion 107 adds a multiplication output signal α (f1−f0) thereof as correction data to the current input signal f1 to obtain an output signal having its responsiveness improved, the device provided with highlight coefficient controlling portions for performing predetermined decoding by inputting the input signal f1 or the difference signal (f1−f0) and converting it to a signal having a change characteristic different from that signal and outputting a highlight coefficient α adapted to the input signal or the difference signal by using that decode value.

20 Claims, 22 Drawing Sheets

FIG.4

105

α DECODE VALUE

| DECODE VALUE [HEX] | α VALUE [TIMES] | DECODE VALUE [HEX] | α VALUE [TIMES] | DECODE VALUE [HEX] | α VALUE [TIMES] | DECODE VALUE [HEX] | α VALUE [TIMES] |
|---|---|---|---|---|---|---|---|
| 00 | 0.00000 | 20 | 0.25000 | 40 | 0.50000 | 60 | 0.75000 |
| 01 | 0.00781 | 21 | 0.25781 | 41 | 0.50781 | 61 | 0.75781 |
| 02 | 0.01563 | 22 | 0.26563 | 42 | 0.51563 | 62 | 0.76563 |
| 03 | 0.02344 | 23 | 0.27344 | 43 | 0.52344 | 63 | 0.77344 |
| 04 | 0.03125 | 24 | 0.28125 | 44 | 0.53125 | 64 | 0.78125 |
| 05 | 0.03906 | 25 | 0.28906 | 45 | 0.53906 | 65 | 0.78906 |
| 06 | 0.04688 | 26 | 0.29688 | 46 | 0.54688 | 66 | 0.79688 |
| 07 | 0.05469 | 27 | 0.30469 | 47 | 0.55469 | 67 | 0.80469 |
| 08 | 0.06250 | 28 | 0.31250 | 48 | 0.56250 | 68 | 0.81250 |
| 09 | 0.07031 | 29 | 0.32031 | 49 | 0.57031 | 69 | 0.82031 |
| 0A | 0.07813 | 2A | 0.32813 | 4A | 0.57813 | 6A | 0.82813 |
| 0B | 0.08594 | 2B | 0.33594 | 4B | 0.58594 | 6B | 0.83594 |
| 0C | 0.09375 | 2C | 0.34375 | 4C | 0.59375 | 6C | 0.84375 |
| 0D | 0.10156 | 2D | 0.35156 | 4D | 0.60156 | 6D | 0.85156 |
| 0E | 0.10938 | 2E | 0.35938 | 4E | 0.60938 | 6E | 0.85938 |
| 0F | 0.11719 | 2F | 0.36719 | 4F | 0.61719 | 6F | 0.86719 |
| 10 | 0.12500 | 30 | 0.37500 | 50 | 0.62500 | 70 | 0.87500 |
| 11 | 0.13281 | 31 | 0.38281 | 51 | 0.63281 | 71 | 0.88281 |
| 12 | 0.14063 | 32 | 0.39063 | 52 | 0.64063 | 72 | 0.89063 |
| 13 | 0.14844 | 33 | 0.39844 | 53 | 0.64844 | 73 | 0.89844 |
| 14 | 0.15625 | 34 | 0.40625 | 54 | 0.65625 | 74 | 0.90625 |
| 15 | 0.16406 | 35 | 0.41406 | 55 | 0.66406 | 75 | 0.91406 |
| 16 | 0.17188 | 36 | 0.42188 | 56 | 0.67188 | 76 | 0.92188 |
| 17 | 0.17969 | 37 | 0.42969 | 57 | 0.68969 | 77 | 0.92969 |
| 18 | 0.18750 | 38 | 0.43750 | 58 | 0.68750 | 78 | 0.93750 |
| 19 | 0.19531 | 39 | 0.44531 | 59 | 0.69531 | 79 | 0.94531 |
| 1A | 0.20313 | 3A | 0.45313 | 5A | 0.70313 | 7A | 0.95313 |
| 1B | 0.21094 | 3B | 0.46094 | 5B | 0.71094 | 7B | 0.93094 |
| 1C | 0.21875 | 3C | 0.46875 | 5C | 0.71875 | 7C | 0.96875 |
| 1D | 0.22656 | 3D | 0.47656 | 5D | 0.72656 | 7D | 0.97656 |
| 1E | 0.23438 | 3E | 0.48438 | 5E | 0.73438 | 7E | 0.98438 |
| 1F | 0.24219 | 3F | 0.49219 | 5F | 0.74219 | 7F | 0.99219 |
|  |  |  |  |  |  | 80 | 1.00000 |

α VALUE

FIG.10

801

| DECODE VALUE [HEX] | α VALUE [TIMES] | DECODE VALUE [HEX] | α VALUE [TIMES] | DECODE VALUE [HEX] | α VALUE [TIMES] | DECODE VALUE [HEX] | α VALUE [TIMES] |
|---|---|---|---|---|---|---|---|
| 00 | 0.00000 | 20 | 0.25000 | 40 | 0.50000 | 60 | 0.75000 |
| 01 | 0.00781 | 21 | 0.25781 | 41 | 0.50781 | 61 | 0.75781 |
| 02 | 0.01563 | 22 | 0.26563 | 42 | 0.51563 | 62 | 0.76563 |
| 03 | 0.02344 | 23 | 0.27344 | 43 | 0.52344 | 63 | 0.77344 |
| 04 | 0.03125 | 24 | 0.28125 | 44 | 0.53125 | 64 | 0.78125 |
| 05 | 0.03906 | 25 | 0.28906 | 45 | 0.53906 | 65 | 0.78906 |
| 06 | 0.04688 | 26 | 0.29688 | 46 | 0.54688 | 66 | 0.79688 |
| 07 | 0.05469 | 27 | 0.30469 | 47 | 0.55469 | 67 | 0.80469 |
| 08 | 0.06250 | 28 | 0.31250 | 48 | 0.56250 | 68 | 0.81250 |
| 09 | 0.07031 | 29 | 0.32031 | 49 | 0.57031 | 69 | 0.82031 |
| 0A | 0.07813 | 2A | 0.32813 | 4A | 0.57813 | 6A | 0.82813 |
| 0B | 0.08594 | 2B | 0.33594 | 4B | 0.58594 | 6B | 0.83594 |
| 0C | 0.09375 | 2C | 0.34375 | 4C | 0.59375 | 6C | 0.84375 |
| 0D | 0.10156 | 2D | 0.35156 | 4D | 0.60156 | 6D | 0.85156 |
| 0E | 0.10938 | 2E | 0.35938 | 4E | 0.60938 | 6E | 0.85938 |
| 0F | 0.11719 | 2F | 0.36719 | 4F | 0.61719 | 6F | 0.86719 |
| 10 | 0.12500 | 30 | 0.37500 | 50 | 0.62500 | 70 | 0.87500 |
| 11 | 0.13281 | 31 | 0.38281 | 51 | 0.63281 | 71 | 0.88281 |
| 12 | 0.14063 | 32 | 0.39063 | 52 | 0.64063 | 72 | 0.89063 |
| 13 | 0.14844 | 33 | 0.39844 | 53 | 0.64844 | 73 | 0.89844 |
| 14 | 0.15625 | 34 | 0.40625 | 54 | 0.65625 | 74 | 0.90625 |
| 15 | 0.16406 | 35 | 0.41406 | 55 | 0.66406 | 75 | 0.91406 |
| 16 | 0.17188 | 36 | 0.42188 | 56 | 0.67188 | 76 | 0.92188 |
| 17 | 0.17969 | 37 | 0.42969 | 57 | 0.68969 | 77 | 0.92969 |
| 18 | 0.18750 | 38 | 0.43750 | 58 | 0.68750 | 78 | 0.93750 |
| 19 | 0.19531 | 39 | 0.44531 | 59 | 0.69531 | 79 | 0.94531 |
| 1A | 0.20313 | 3A | 0.45313 | 5A | 0.70313 | 7A | 0.95313 |
| 1B | 0.21094 | 3B | 0.46094 | 5B | 0.71094 | 7B | 0.93094 |
| 1C | 0.21875 | 3C | 0.46875 | 5C | 0.71875 | 7C | 0.96875 |
| 1D | 0.22656 | 3D | 0.47656 | 5D | 0.72656 | 7D | 0.97656 |
| 1E | 0.23438 | 3E | 0.48438 | 5E | 0.73438 | 7E | 0.98438 |
| 1F | 0.24219 | 3F | 0.49219 | 5F | 0.74219 | 7F | 0.99219 |
| | | | | | | 80 | 1.00000 |

FIG.11

802

| DECODE VALUE [HEX] | α VALUE [TIMES] | DECODE VALUE [HEX] | α VALUE [TIMES] | DECODE VALUE [HEX] | α VALUE [TIMES] | DECODE VALUE [HEX] | α VALUE [TIMES] |
|---|---|---|---|---|---|---|---|
| 00 | 0.00000 | 20 | 0.37500 | 40 | 0.75000 | 60 | 1.12500 |
| 01 | 0.01172 | 21 | 0.38672 | 41 | 0.76172 | 61 | 1.13672 |
| 02 | 0.02344 | 22 | 0.39844 | 42 | 0.77344 | 62 | 1.14844 |
| 03 | 0.03516 | 23 | 0.41016 | 43 | 0.78516 | 63 | 1.16016 |
| 04 | 0.04688 | 24 | 0.42188 | 44 | 0.79688 | 64 | 1.17188 |
| 05 | 0.05859 | 25 | 0.43359 | 45 | 0.80859 | 65 | 1.18359 |
| 06 | 0.07031 | 26 | 0.44531 | 46 | 0.82031 | 66 | 1.19531 |
| 07 | 0.08203 | 27 | 0.45703 | 47 | 0.93203 | 67 | 1.20703 |
| 08 | 0.09375 | 28 | 0.46875 | 48 | 0.84375 | 68 | 1.21875 |
| 09 | 0.10547 | 29 | 0.48047 | 49 | 0.85547 | 69 | 1.23047 |
| 0A | 0.11719 | 2A | 0.49219 | 4A | 0.86719 | 6A | 1.24219 |
| 0B | 0.12891 | 2B | 0.50391 | 4B | 0.87891 | 6B | 1.25391 |
| 0C | 0.14063 | 2C | 0.51563 | 4C | 0.89063 | 6C | 1.26563 |
| 0D | 0.15234 | 2D | 0.52734 | 4D | 0.90234 | 6D | 1.27734 |
| 0E | 0.16406 | 2E | 0.53906 | 4E | 0.91406 | 6E | 1.28906 |
| 0F | 0.17578 | 2F | 0.55078 | 4F | 0.92578 | 6F | 1.30078 |
| 10 | 0.18750 | 30 | 0.56250 | 50 | 0.93750 | 70 | 1.31250 |
| 11 | 0.19922 | 31 | 0.57422 | 51 | 0.94922 | 71 | 1.32422 |
| 12 | 0.21094 | 32 | 0.58594 | 52 | 0.96094 | 72 | 1.33594 |
| 13 | 0.22266 | 33 | 0.59766 | 53 | 0.97266 | 73 | 1.34766 |
| 14 | 0.23438 | 34 | 0.60938 | 54 | 0.98438 | 74 | 1.35938 |
| 15 | 0.24609 | 35 | 0.62109 | 55 | 0.99609 | 75 | 1.37109 |
| 16 | 0.25781 | 36 | 0.63281 | 56 | 1.00781 | 76 | 1.38281 |
| 17 | 0.26953 | 37 | 0.64453 | 57 | 1.01953 | 77 | 1.39453 |
| 18 | 0.28125 | 38 | 0.65625 | 58 | 1.03125 | 78 | 1.40625 |
| 19 | 0.29297 | 39 | 0.66797 | 59 | 1.04297 | 79 | 1.41797 |
| 1A | 0.30469 | 3A | 0.67969 | 5A | 1.05469 | 7A | 1.42969 |
| 1B | 0.31641 | 3B | 0.69141 | 5B | 1.06641 | 7B | 1.44141 |
| 1C | 0.32813 | 3C | 0.70313 | 5C | 1.07813 | 7C | 1.45313 |
| 1D | 0.33984 | 3D | 0.71484 | 5D | 1.08984 | 7D | 1.46484 |
| 1E | 0.35156 | 3E | 0.72656 | 5E | 1.10156 | 7E | 1.47656 |
| 1F | 0.36328 | 3F | 0.73828 | 5F | 1.11328 | 7F | 1.48828 |
| | | | | | | 80 | 1.50000 |

FIG.21

| | | INPUT RANGE |
|---|---|---|
| FIRST INPUT RANGE SETUP REGISTER | 63 [dec]: 3F [hex] | 0~63 [dec] |
| SECOND INPUT RANGE SETUP REGISTER | 127 [dec]: 7F [hex] | 64~128 [dec] |
| THIRD INPUT RANGE SETUP REGISTER | 191 [dec]: BF [hex] | 129~191 [dec] |
| FOURTH INPUT RANGE SETUP REGISTER | 255 [dec]: FF [hex] | 192~255 [dec] |

FIG.22

| | | INPUT RANGE | | |
|---|---|---|---|---|
| FIRST INPUT RANGE SETUP REGISTER | 63 [dec]: 3F [hex] | 0~63 [dec] | FIRST α SETUP REGISTER OUTPUT | 0.5 [dec] |
| SECOND INPUT RANGE SETUP REGISTER | 127 [dec]: 7F [hex] | 64~128 [dec] | SECOND α SETUP REGISTER OUTPUT | 0.1 [dec] |
| THIRD INPUT RANGE SETUP REGISTER | 191 [dec]: BF [hex] | 129~191 [dec] | THIRD α SETUP REGISTER OUTPUT | 0.1 [dec] |
| FOURTH INPUT RANGE SETUP REGISTER | 255 [dec]: FF [hex] | 192~255 [dec] | FOURTH α SETUP REGISTER OUTPUT | 0.5 [dec] |

FIG.25

| | | DIFFERENCE RANGE |
|---|---|---|
| FIRST DIFFERENCE RANGE SETUP REGISTER | 63 [dec]: 3F [hex] | 0~63 [dec] |
| SECOND DIFFERENCE RANGE SETUP REGISTER | 127 [dec]: 7F [hex] | 64~128 [dec] |
| THIRD DIFFERENCE RANGE SETUP REGISTER | 191 [dec]: BF [hex] | 129~191 [dec] |
| FOURTH DIFFERENCE RANGE SETUP REGISTER | 255 [dec]: FF [hex] | 192~255 [dec] |

FIG.26

| | | DIFFERENCE RANGE | | |
|---|---|---|---|---|
| FIRST DIFFERENCE RANGE SETUP REGISTER | 63 [dec]: 3F [hex] | 0~63 [dec] | FIRST α SETUP REGISTER OUTPUT | 0.5 [dec] |
| SECOND DIFFERENCE RANGE SETUP REGISTER | 127 [dec]: 7F [hex] | 64~128 [dec] | SECOND α SETUP REGISTER OUTPUT | 0.1 [dec] |
| THIRD DIFFERENCE RANGE SETUP REGISTER | 191 [dec]: BF [hex] | 129~191 [dec] | THIRD α SETUP REGISTER OUTPUT | 0.1 [dec] |
| FOURTH DIFFERENCE RANGE SETUP REGISTER | 255 [dec]: FF [hex] | 192~255 [dec] | FOURTH α SETUP REGISTER OUTPUT | 0.5 [dec] |

FIG.27

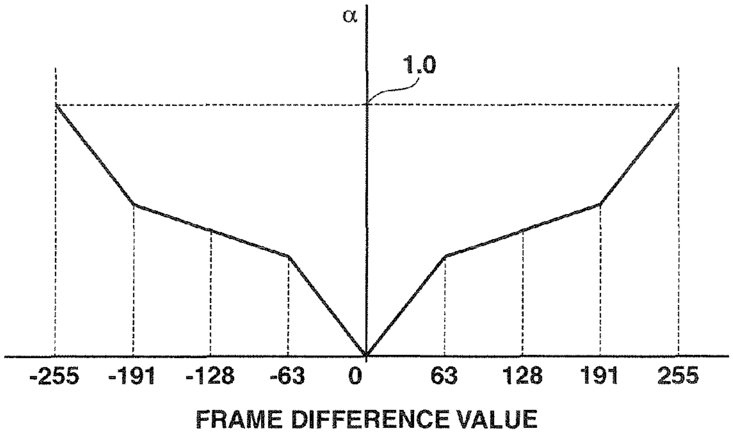

IMAGE DISPLAY ADJUSTING DEVICE

CROSS-REFERENCE TO RELATED APPLICATIONS

This application is based upon and claims the benefit of priority from the prior Japanese Patent Application No. 2005-322439 filed on Nov. 7, 2005; the entire contents of which are incorporated herein by reference.

BACKGROUND OF THE INVENTION

1. Field of the Invention

The present invention relates to an image display adjusting device for allowing a display device such as a liquid crystal display to improve response characteristics in image display and display a moving image of high image quality.

2. Description of the Related Art

Flat panel displays (referred to as FPDs hereafter) of recent years are getting larger and higher-resolution, and a liquid crystal display is also demanded to be larger and of higher image quality. Of the FPDs, the liquid crystal display is particularly familiarized and drawing the highest attention. Therefore, there is a further demand for higher image quality. However, the liquid crystal display has a problem that its response speed of display is slower than that of other FPDs.

The response characteristics of a liquid crystal panel of the liquid crystal display will be presented hereunder. FIG. 28A shows a voltage waveform inside a liquid crystal layer, and FIG. 28B shows the voltage waveform after improving the response speed.

The liquid crystal panel changes an orientation of liquid crystal molecules by applying a voltage between liquid crystal layers according to a gradation to be displayed, and thereby controls a transmitted light volume of backlight so as to display an image. Here, an applied voltage for assigning intensity levels requires plenty of time before reaching a target gradation voltage due to factors such as a liquid crystal capacity, a CR time constant of connection resistance with a liquid crystal driving circuit and the like as shown in FIG. 28A. This is a cause of slowness of the response characteristics as to the liquid crystal panel. The slowness of the response characteristics is particularly conspicuous as to a moving image sequence in comparison with a conventional CRT and the like, where it remains as an afterimage. There is also a problem that the response characteristics are not equal among the liquid crystal panels.

A level adaptive overdrive (referred to as LAO hereafter) driving method is known as one of generally used techniques for improving the response characteristics. The LAO driving method supplies the liquid crystal panel with a higher driving voltage or a lower driving voltage than the gradation voltage of current frame data and thereby reduces a rise time or a fall time of the data so as to improve responsiveness. Here, an example of a general formula of improvement data by the LAO driving method is shown below.

$$\mathrm{LAO}=\alpha(f1-f1)+f1 \quad \text{Formula (1)}$$

Here, LAO: improvement data, α: highlight coefficient, f0: previous frame data, and f1: current frame data.

The formula (1) multiplies a difference value between a current frame and a previous frame by the highlight coefficient α, and adds the data after the multiplication to the current frame data as correction data for improving the response speed. It is thereby possible to acquire the improvement data having the response speed of the liquid crystal improved in a pseudo manner. As shown in FIG. 28B, this temporarily adds the correction data of a higher level or a lower level than a target gradation level on a rise or a fall of a liquid crystal driving waveform so that the time before reaching the target gradation level can be reduced. Such a LAO driving method is introduced as a heretofore known example by Japanese Patent Laid-Open No. 7-20828 and the like.

As for the technique of the LAO driving method, however, there arises a problem that image quality is degraded in the case where a specific image (such as a moving image) is displayed. This will be described below. In the description, [dec] denotes a decimal number and [hex] denotes a hexadecimal number.

As an example thereof, a case of image degradation due to over-highlight will be described with reference to FIGS. 29A and 29B. In the case where, as shown in FIG. 29A, there is a display Q of a gradation level 255 [dec] in a display P of a background gradation level 127 [dec] and the display Q of the gradation level 255 [dec] moves as in FIG. 29B, the gradation level of the data at a position before the movement in a screen after the movement (1 frame later) should be 127 [dec] as gradation data thereof. As the improvement in the responsiveness of the aforementioned formula (1) is implemented by the LAO, however, the data LAO on the improvement in the responsiveness of the image at the position before the movement in the screen after the movement becomes the LAO=α(127−255)+127. Here, the LAO depends on the value of the highlight coefficient α. However, α=0.5 is an optimal value in the other images, and so this value is also used as a fixed value here. In that case, it becomes LAO=0.5×(127−255)+127=63 [dec]. Therefore, the gradation level of the display Q at the position before the movement in the screen after the movement of FIG. 28B is 63 [dec] according to the foregoing calculation, which causes a problem that the gradation level lowers as against the background gradation level 127 [dec] and it significantly darkens. To be more specific, the image quality is degraded because the highlight coefficient α is overly set (overly highlighted) . Thus, setting of the value α also depends on a type of a display image and a characteristic of each individual display panel. If the value α is fixed, there is an adverse effect on the moving image described above as to the gradation level.

Japanese Patent Laid-Open No. 2005-173525 also describes an example using the LAO driving method. It describes that a highlight conversion parameter (OS parameter) equivalent to the value α is stored in an ROM for each individual gradation of image data so as to read out and use the parameter stored in the ROM according to the level of the image data.

In the example described in Japanese Patent Laid-Open No. 2005-173525, however, a circuit scale is expanded by using the ROM while it requires work of measuring the response characteristics of each individual liquid crystal display panel and deciding the parameter to the ROM, which takes a lot of trouble. It also has a drawback that the ROM size becomes larger and the circuit scale increases if rendered versatile to be adaptable to any panel.

BRIEF SUMMARY OF THE INVENTION

An embodiment of the present invention provides an image display adjusting device including: a memory portion configured to hold an input signal by one frame; a difference portion configured to obtain a difference signal between the input signal preceding by one frame held by the memory portion and a current input signal; a multiplication portion configured to multiply the difference signal from the difference portion by a highlight coefficient; an addition portion configured to add an output signal of the multiplication portion to the current input signal; and a highlight coefficient controlling portion configured to perform predetermined decoding by inputting the input signal or the difference signal and converting it to a signal having a change characteristic different from that signal and to output the highlight coefficient adapted to the input signal or the difference signal by using that decode value. Here, the decoding means a function of inputting a certain signal and converting it to a signal having a change characteristic different from a change in that signal, where an outputted conversion signal is the decode value.

Another embodiment of the present invention provides an image display adjusting device including: a memory portion configured to hold an input signal by one frame; a difference portion configured to obtain a difference signal between the input signal preceding by one frame held by the memory portion and a current input signal; a multiplication portion configured to multiply the difference signal from the difference portion by a highlight coefficient; an addition portion configured to add an output signal of the multiplication portion to the current input signal; and a highlight coefficient controlling portion configured to perform predetermined decoding by inputting the input signal or the difference signal and converting it to a signal having a change characteristic different from that signal and to output the highlight coefficient adapted to the input signal or the difference signal by using that decode value, the highlight coefficient controlling portion having a setup register capable of adjusting the highlight coefficient from outside.

A further embodiment of the present invention provides an image display adjusting device including: a memory portion configured to hold an input signal by one frame; a difference portion configured to obtain a difference signal between the input signal preceding by one frame held by the memory portion and a current input signal; a multiplication portion configured to multiply the difference signal from the difference portion by a highlight coefficient; an addition portion configured to add an output signal of the multiplication portion to the current input signal; and a highlight coefficient controlling portion configured to perform predetermined decoding by inputting the difference signal and converting it to a signal having a change characteristic different from that signal and to output the highlight coefficient adapted to the difference signal by using that decode value, the highlight coefficient controlling portion having a setup register capable of adjusting a range of the difference signal from outside and to set the value of the highlight coefficient for multiple difference ranges dividing the range with the setup register, the highlight coefficient controlling portion further having a setup register capable of adjusting a range of the input signal or the difference signal from outside and the setting the value of the highlight coefficient for multiple input ranges or difference ranges dividing the range with setup register.

BRIEF DESCRIPTION OF THE DRAWINGS

FIG. 4 is a diagram showing a configuration of an α value selection circuit of FIG. 1;

FIG. 10 is a diagram showing one of tables of FIG. 9;

FIG. 11 is a diagram showing the other table of FIG. 9;

FIG. 21 is an explanatory diagram of input range setup registers of FIG. 20;

FIG. 22 is an explanatory diagram of α setup registers of FIG. 20;

FIG. 25 is an explanatory diagram of difference range setup registers of FIG. 24;

FIG. 26 is an explanatory diagram of the α setup registers of FIG. 24;

FIG. 27 is a characteristic diagram showing a change characteristic of the α value against a range of frame difference value [dec] equivalent to the α decode value according to the sixth embodiment of the present invention;

DETAILED DESCRIPTION OF THE INVENTION

Embodiments of the present invention will be described with reference to the drawings.

First Embodiment

A first embodiment of the present invention will be described with reference to FIGS. 1 to 5B.

Figure 1:
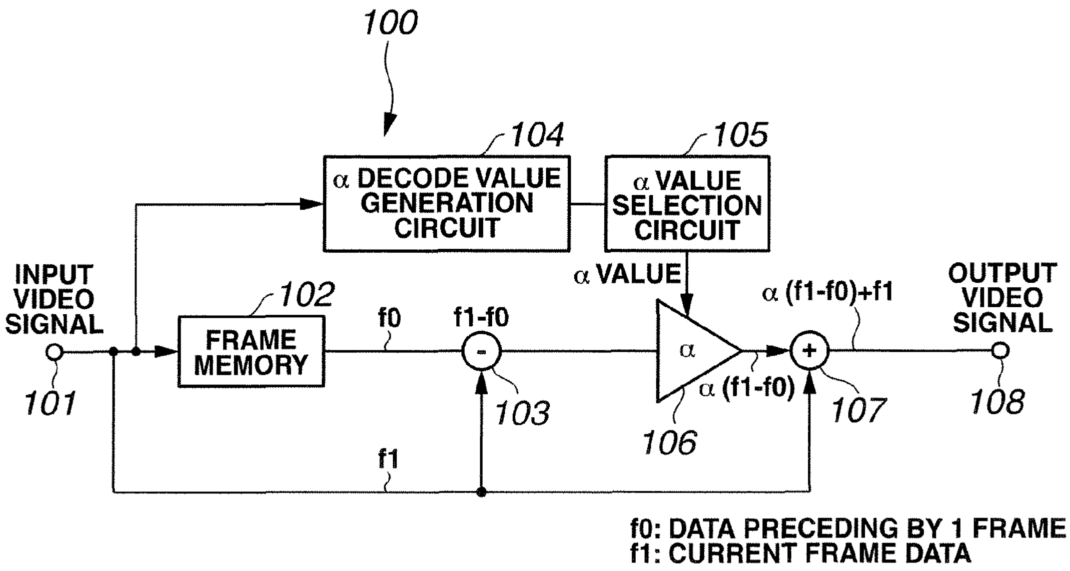
FIG. 1 is a block diagram of an image display adjusting device according to a first embodiment of the present invention.

FIG. 1 is a block diagram of an image display adjusting device according to the first embodiment of the present invention.

In FIG. 1, an image display adjusting device 100 includes an input terminal of a video signal 101, a frame memory 102 capable of storing the video signals equivalent to one frame, a difference device 103 for taking a difference between an input video signal f1 of a current frame and a video signal f0 of an immediately preceding frame from the frame memory 102 and detecting a gradation difference (f1−f0) between the frames, an α decode value generation circuit 104 for performing predetermined decoding to the input video signal to automatically acquire an optimal α value, an α value selection circuit 105 for selecting the optimal α value by using a decode value from the α decode value generation circuit 104, a multiplier 106 as a multiplication portion for multiplying the gradation difference (f1−f0) between the frames from the difference device 103 by the optimal highlight coefficient α selected by the α value selection circuit 105 to generate correction data {α(f1−f0)} for improving response speed, and an adder 107 as an addition portion for adding the current input video signal f1 to the correction data {α(f1−f0) } for improving the response speed and outputting improvement data {α(f1−f0)+f1}. Here, the decoding means a function of inputting a certain signal and converting it to a signal having a change characteristic different from a change in that signal, where an outputted conversion signal is the decode value.

Thus, the data having the current input video signal f1 and the correction data {α(f1−f0) } for improving the response speed added thereto is outputted as an output video signal from an output terminal 108 so as to make a circuit configuration for realizing the formula (1) of the LAO. The improved output video signal from the output terminal 108 is supplied to a liquid crystal panel via an inversion circuit (not shown) in a subsequent stage. The α decode value generation circuit 104 and α value selection circuit 105 configure a highlight coefficient controlling portion.

The first embodiment of FIG. 1 automatically generates the α value based on the input video signal according to the input video signal level with the α decode value generation circuit 104 and α value selection circuit 105 to supply it to the multiplier 106 rather than reading out a predetermined highlight coefficient α from an ROM or the like and giving it to the multiplier 106. It is thereby possible to supply an adequate α value on a small circuit scale.

Figure 2:
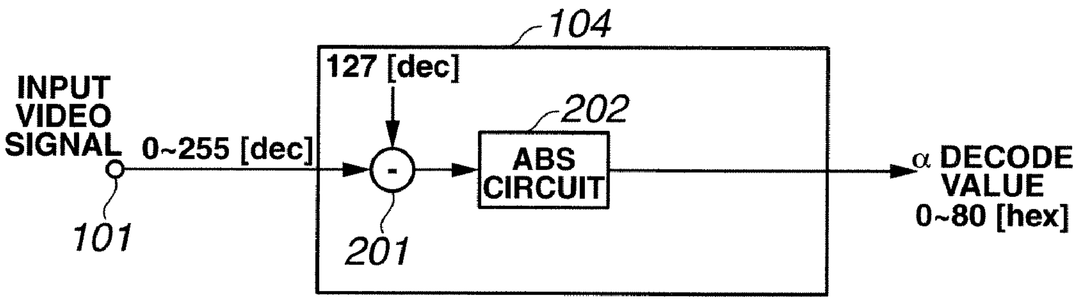
FIG. 2 is a block diagram of an α decode value generation circuit of FIG. 1.
Figure 3:
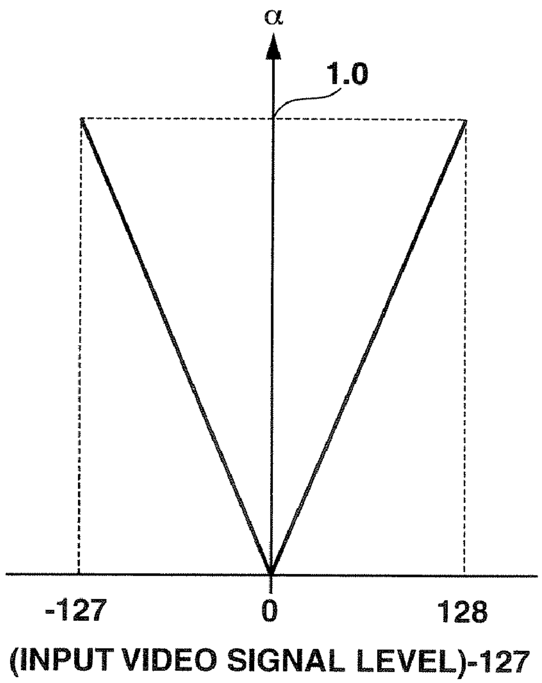
FIG. 3 is a diagram showing a relation between {(input video signal level−127} [dec] equivalent to an α decode value and an α value of FIG. 2.

Next, the α decode value generation circuit 104 and α value selection circuit 105 described above will be described with reference to FIGS. 2 to 4. FIG. 3 shows a relation between {(input video signal level−127} [dec] equivalent to an α decode value and the α value in the α decode value generation circuit of FIG. 2.

This embodiment assumes the case where the gradation of the input video signal is handled by 8 bits (0 to 255 [dec]) as a precondition. Here, assuming that the α decode value generation circuit 104 is configured as shown in FIG. 2, and subtracts 127 [dec] (or 128 [dec]) from the input video signal with a difference device 201 so as to render that difference data as an absolute value with an absolute value circuit (an ABS circuit hereafter) 202. In this case, image degradation due to over-highlight of the α value mainly occurs in a half-tone portion so that the α value needs to be set small around half-tone (127 [dec]) while the α value is set larger as the gradation goes away from the half-tone. Thus, the data rendered as the absolute value can be represented as 0 to 128 [dec] centering on 127 (half-tone) and realize a characteristic as shown in FIG. 3. FIG. 3 represents the characteristic whereby a horizontal axis is (input video signal level)−127 and a vertical axis is the α value.

Next, the α value selection circuit 105 will be concretely described by using FIG. 4.

The α value selection circuit 105 receives the α decode value (0 to 128 [dec]) generated by the α decode value generation circuit 104 and selects a desired α value. As shown in FIG. 4, the α value selection circuit 105 has a table in this embodiment, and is configured to change the α value 0.00000 to 1.00000 [times] by 0.00781 against the change in the α decode value. Thus, this embodiment has a V-shaped characteristic whereby, according to the input video signal, the α value can be set small around the half-tone and changes linearly according to a degree of going away from the half-tone as the characteristic shown in FIG. 3.

As previously described, according to this embodiment, the α decode value generation circuit 104 has a decoding function of setting the α value to a minimum value as a reference at a half-tone level of the input video signal and increasing and decreasing the α value according to size of a difference value generated by the input video signal against the half-tone level. The α value can be decided based on the decode value by the α value selection circuit 105.

This embodiment assumes that the α value is linearly generated. As previously described, however, the α value depends on each individual panel characteristic so that it may have a nonlinear characteristic matched to the panel characteristic.

According to the above, α optimal to the input video signal is generated to realize the improvement data LAO indicated in the formula (1).

Figure 5A:
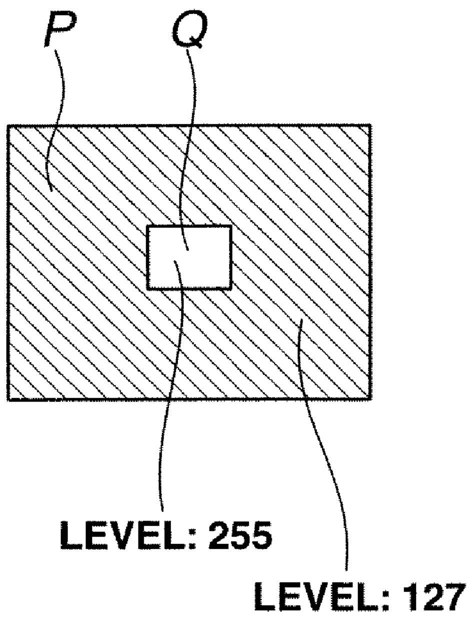
FIGS. 5A and 5B are explanatory diagrams showing an example of improvement in image degradation according to the first embodiment of the present invention.
Figure 5B:
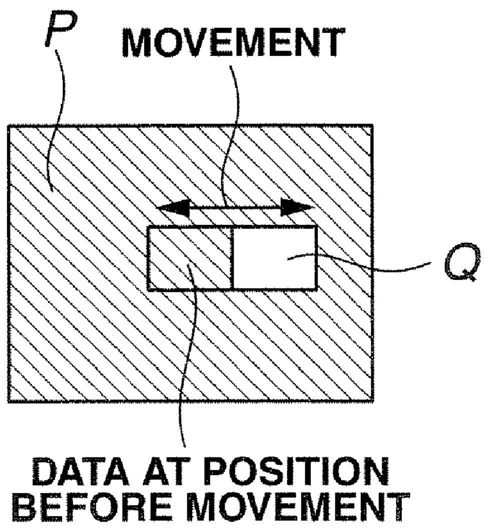
Figure 29A:
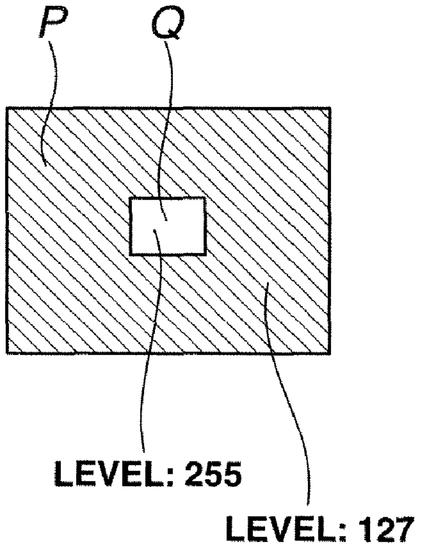
FIG.29A (PRIOR ART)
FIGS. 29A and 29B are explanatory diagrams showing an example of image degradation due to over-highlight by the conventional technique.
Figure 29B:
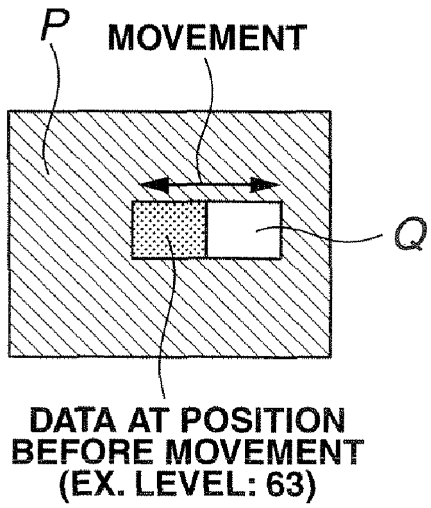
FIG.29B (PRIOR ART)

Next, the effects of this embodiment will be described by using FIGS. 5A and 5B as to a display image brought into question by FIGS. 29A and 29B described above. As with FIGS. 29A and 29B, FIGS. 5A and 5B have a display Q of a gradation level 255 [dec] in a display P of a background gradation level 127 [dec], and the display Q of the gradation level 255 [dec] moves as in FIG. 5B. Here, the data at a position before the movement previously brought into question is as follows from the formula (1) of the LAO.

$$LAO=\alpha(127-255)+127 \quad \text{Formula (2)}$$

The α decode value obtained by the α decode value generation circuit 104 in this embodiment is input video signal level (127 [dec])−127 [dec]=0 [dec] as shown in FIG. 3. Therefore, as for the α value, α value=0.00000 [times] is acquired from FIG. 4. Therefore, the formula (2) becomes LAO=0.00000×(127−255) +127=127 [dec]. It matches with the value of the true data 127 [dec] at the position before the movement in the screen after the movement so that the improvement data LAO can suppress degradation of image quality due to the over-highlight. It is thereby possible to automatically select the optimal α value from the input video signal. Therefore, it is possible to generate the α decode value from the input video signal with the α decode value generation circuit and allow the α value to be set small around the half-tone level of the input video signal by using a correspondence between the α decode value and the α value so as to suppress the over-highlight on a small circuit scale and realize higher image quality.

Second Embodiment

An image display adjusting device 100A according to a second embodiment of the present invention will be described with reference to FIGS. 6 to 12. The same portions as the first embodiment will be given the same symbols and described.

Figure 6:
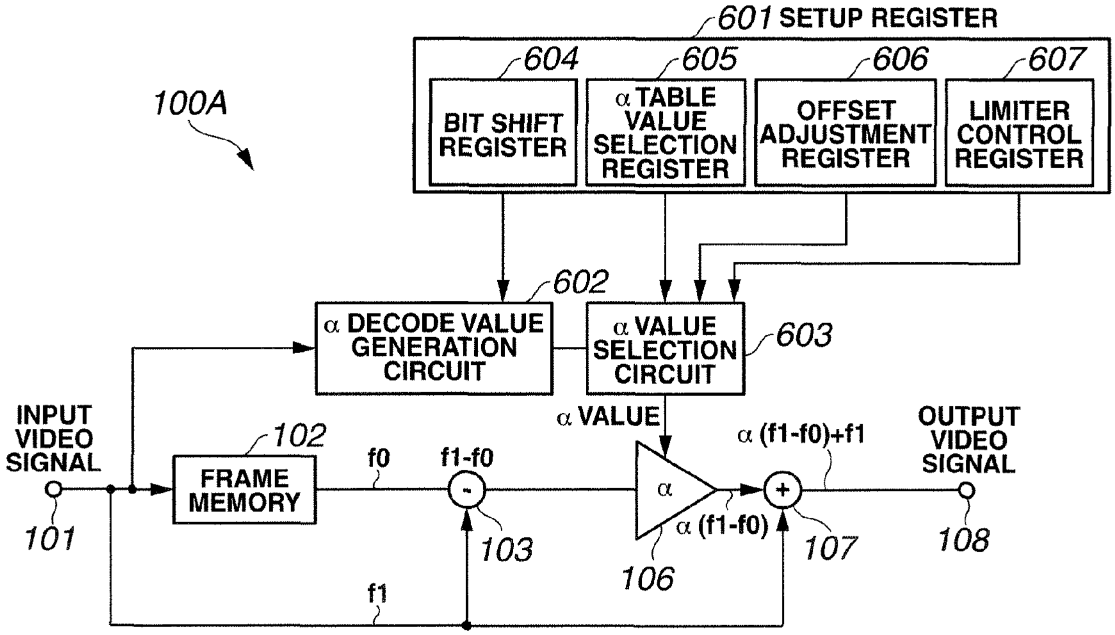
FIG. 6 is a block diagram of the image display adjusting device according to a second embodiment of the present invention.

FIG. 6 is a block diagram of the image display adjusting device according to the second embodiment of the present invention. A major difference from the aforementioned first embodiment is that a setup register 601 is provided, and an α decode value generation circuit 602 and an α value selection circuit 603 are controllable from outside (a microcomputer for instance) by the setup register 601.

The setup register 601 includes a bit shift register 604 for controlling the α decode value generation circuit 602, an α table value selection register 605 for controlling an α table value of the α value selection circuit 603, an offset adjustment register 606 for adjusting (that is, offsetting) the α value to a predetermined value between 0 and an upper limit (1 for instance) at the half-tone level of the input signal, and a limiter control register 607 for controlling the upper limit of the α value. Components other than the setup register 601, α decode value generation circuit 602 and α value selection circuit 603 have the same configurations and perform the same operations as in the first embodiment. The α decode value generation circuit 602, α value selection circuit 603 and setup register 601 configure the highlight coefficient controlling portion.

The operation of the second embodiment will be described with reference to FIGS. 7 to 12 centering on the setup register 601, α decode value generation circuit 602 and α value selection circuit 603.

Figure 7:
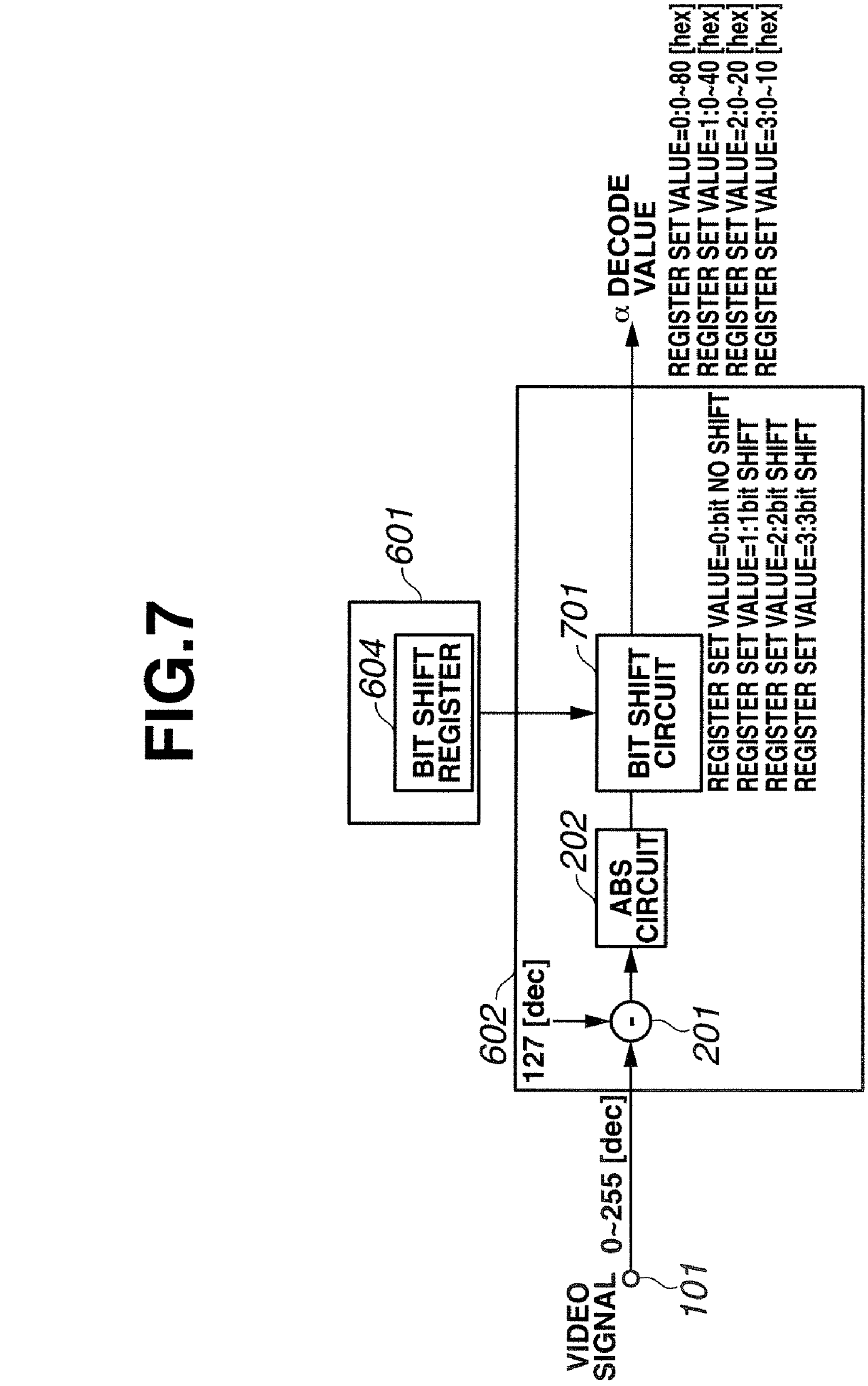
FIG. 7 is a block diagram of the α decode value generation circuit of FIG. 6.

First, FIG. 7 shows the α decode value generation circuit 602 of this embodiment. It has a configuration wherein, as against the configuration of the first embodiment in FIG. 2, a bit shift circuit 701 is provided after the ABS circuit 202 to receive the value outputted from the bit shift register 604 in the setup register 601 so as to bit-shift the data rendered as the absolute value by the ABS circuit 202.

The bit shift circuit 701 has a configuration wherein it does not bit-shift when the value of the bit shift register 604=0, shifts 1 bit when the value of the bit shift register 604=1, shifts 2 bits when the value of the bit shift register 604=2, and shifts 3 bits when the value of the bit shift register 604=3. Such bit shift control causes the α decode value to be multiplied by a multiple of ½ each time binary number data rendered as the absolute value by the ABS circuit 202 is shifted rightward by 1 bit. Therefore, the α decode value (0 to 128 [dec]=0 to 80 [hex]) of the first embodiment becomes the α decode value (0 to 64 [dec]=0 to 40 [hex]) in a 1-bit shift, the α decode value (0 to 32 [dec]=0 to 20 [hex]) in a 2-bit shift, and the α decode value (0 to 16 [dec]=0 to 10 [hex]) in a 3-bit shift. Thus, the α decode value is variable. Consequently, allocation of the α values of the input video signals is easily variable, and general versatility of the α values can be enhanced on a small circuit scale.

Figure 8A:
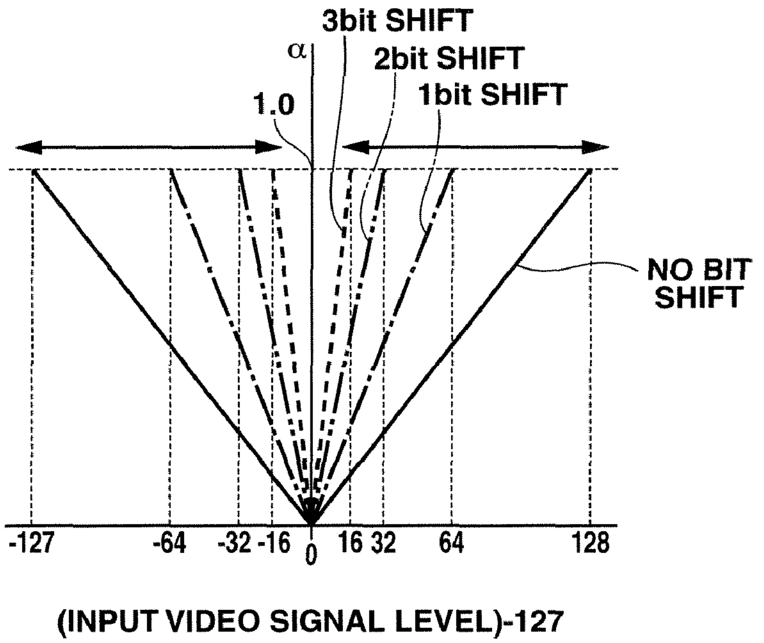
FIGS. 8A and 8B are characteristic diagrams showing a change characteristic of the α value by controlling a setup register according to the second embodiment of the present invention.

Thus, by providing the bit shift register 604 in the setup register 601 and the bit shift circuit 701 in the α decode value generation circuit 602, it is possible to bit-shift the α decode value and further enhance the general versatility of the α values. To be more specific, the bit shift register 604 can cause the α decode value to be multiplied by a multiple of ½ each time it shifts rightward by 1 bit and cause the α decode value to be multiplied by a multiple of 2 each time it shifts leftward by 1 bit. Therefore, it is possible, as shown in FIG. 8A, to change the degree (ratio) of change in the α value according to the kind of liquid crystal panel or a characteristic difference (characteristic variation) of each individual liquid crystal panel so as to facilitate α value setting matched to the characteristic of each individual panel.

Figure 9:
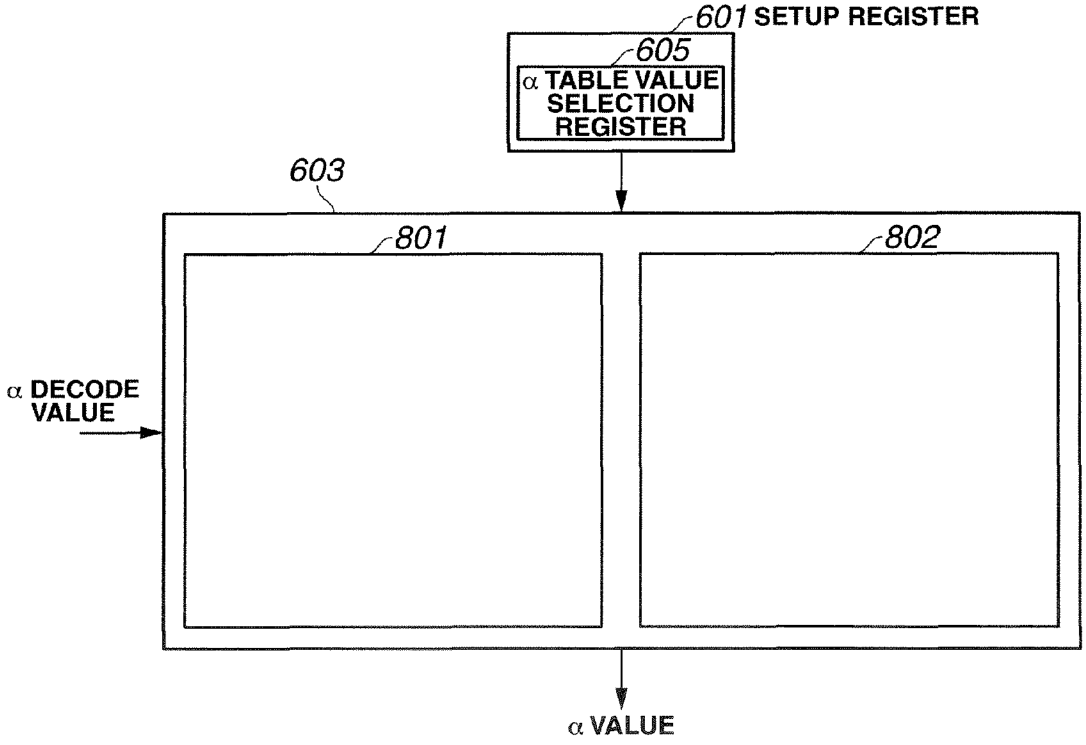
FIG. 9 is a diagram showing the configuration of the α value selection circuit of FIG. 6.

Next, the α value selection circuit 603 of FIG. 9 will be described. FIG. 10 is a diagram showing one table value 801 of the α value selection circuit 603 of FIG. 9, and FIG. 11 is a diagram showing the other table value of the α value selection circuit 603 of FIG. 9.

The α value selection circuit 603 has multiple (two in the drawings) different α value tables 801 and 802, and receives the value of the α table value selection register 605 in the setup register 601. In the case of the value of the α table value selection register 605=0, the α value selection circuit 603 determines the values of the table 801 shown in FIG. 10 to be effective. In the case of the value of the α table value selection register 605=1, the α value selection circuit 603 determines the values of the table 802 shown in FIG. 11 to be effective.

Figure 12:
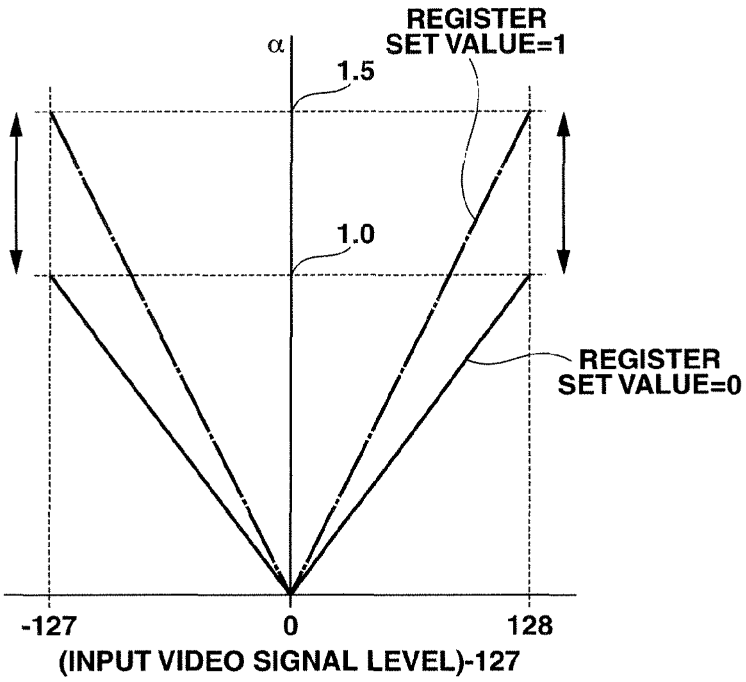
FIG. 12 is a characteristic diagram showing a change characteristic of the α value by selecting α table values from multiple α tables according to the second embodiment of the present invention.

Here, FIG. 12 shows the change characteristic of the α value by selecting α table values from multiple α tables such as FIGS. 10 and 11. As two different α tables can be selected as shown in FIG. 12 by providing the α table value selection register 605 in the setup register 601, it is possible to further enhance the general versatility of the α values. FIG. 12 shows the characteristic in the case where the range of the α decode value is fixed and the upper limit of the α value is changed.

Thus, as for the α table value selection register 605, it is also possible, on selecting the α value according to the inputted α decode value, to specify an α selection table to be used to the α value selection circuit 603 including multiple α selection tables for the α decode values in advance so as to enhance the general versatility about the α values for various panels.

Figure 8B:
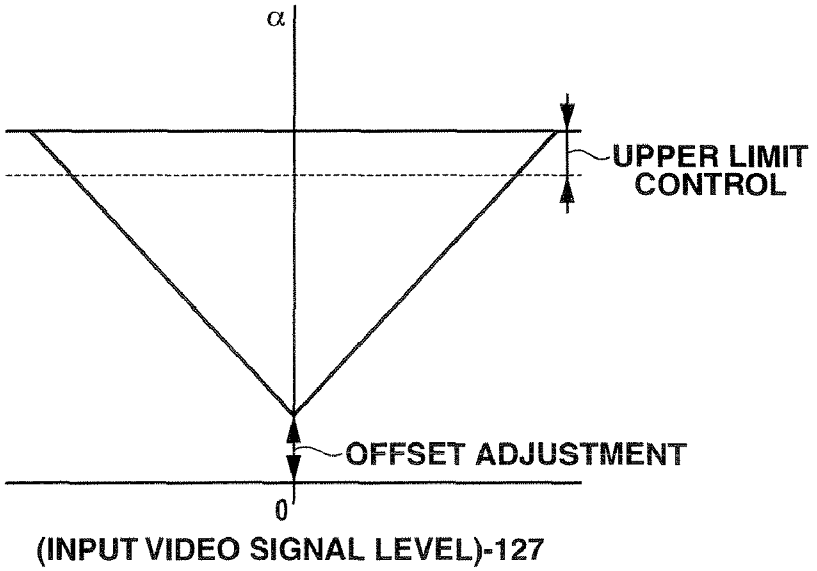

As shown in FIG. 6, it is further possible, as to the α value selection circuit 603, to adjust an offset of the α value at the half-tone level and control the upper limit of the α value as shown in FIG. 8B by using the offset adjustment register 606 and limiter control register 607 in the setup register 601.

The bit shift register 604, α table value selection register 605, offset adjustment register 606 and limiter control register 607 configuring the setup register 601 are configured by a latch circuit consisting of a flip-flop circuit hardware-wise so as to be implemented as the value set by software in an external microcomputer not shown is held by the latch circuit through a bus.

The second embodiment shows a configuration using two different α tables in FIG. 9, where the general versatility can be further enhanced in a configuration having the multiple tables prepared.

As described above, the components other than the setup register 601, α decode value generation circuit 602 and α value selection circuit 603 perform the same operations as in the first embodiment. Therefore, according to this embodiment, it is possible, by providing the setup register 601, α decode value generation circuit 602 and α value selection circuit 603, to automatically select the optimal α value from the input video signal and enhance the general versatility of the α values on a small circuit scale so as to suppress the over-highlight and realize higher image quality, as in the first embodiment.

Third Embodiment

Next, an image display adjusting device 100B according to a third embodiment of the present invention will be described with reference to FIGS. 13 to 15. The same portions as the first embodiment will be given the same symbols and described.

Figure 13:
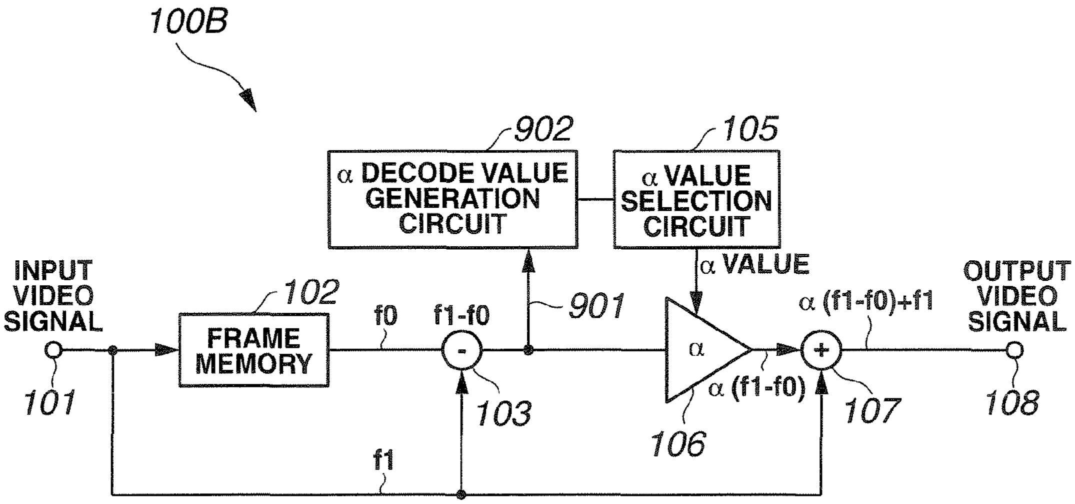
FIG. 13 is a block diagram of the image display adjusting device according to a third embodiment of the present invention.

FIG. 13 is a block diagram of the image display adjusting device according to the third embodiment of the present invention. The image display adjusting device 100B includes an input terminal of a video signal 101, a frame memory 102 capable of storing the video signals equivalent to one frame as in the first embodiment, a difference device 103 for taking a difference between an input video signal f1 of a current frame and a video signal f0 of an immediately preceding frame from the frame memory 102 and detecting a gradation difference (f1−f0) between the frames as in the first embodiment, an α decode value generation circuit 902 for performing predetermined decoding to a difference signal 901 between the input video signal f1 and the video signal f0 of an immediately preceding frame, an α value selection circuit 105 for selecting the optimal α value by using a decode value from the α decode value generation circuit 902, a multiplier 106 as a multiplication portion for multiplying the gradation difference (f1−f0) between the frames from the difference device 103 by the optimal highlight coefficient α selected by the α value selection circuit 105 to generate correction data {α(f1−f0)} for improving response speed, and an adder 107 as an addition portion for adding the current input video signal f1 to the correction data {α(f1−f0)} for improving the response speed and outputting improvement data {α(f1−f0)+f1}.

Thus, the data having the current input video signal f1 and the correction data {α(f1−f0) } for improving the response speed added thereto is outputted as an output video signal from an output terminal 108 so as to make a circuit configuration for realizing the formula (1) of the LAO. The improved output video signal from the output terminal 108 is supplied to a liquid crystal panel (not shown) via an inversion circuit (not shown) in a subsequent stage. The α decode value generation circuit 902 and α value selection circuit 105 configure a highlight coefficient controlling portion.

Here, as for the characteristic of the third embodiment, a major difference from the first embodiment is the α decode value generation circuit 902. The α decode value generation circuit 104 of the first embodiment generated the α decode value from the input video signal. According to this embodiment, however, the α decode value is generated from the frame difference signal 901 showing a difference result f1−f0 between the input video signal f1 and the video signal f0 of the immediately preceding frame. Here, as in the first and second embodiments, the α value of this embodiment should also be set low if the frame difference signal 901 is around the intermediate level. Therefore, it is desired that the relation between the α value and the frame difference signal 901 in FIG. 13 has the same characteristic as that in the case of replacing the horizontal axis of FIG. 3 shown in the first embodiment with the frame difference signal 901.

Figure 14:
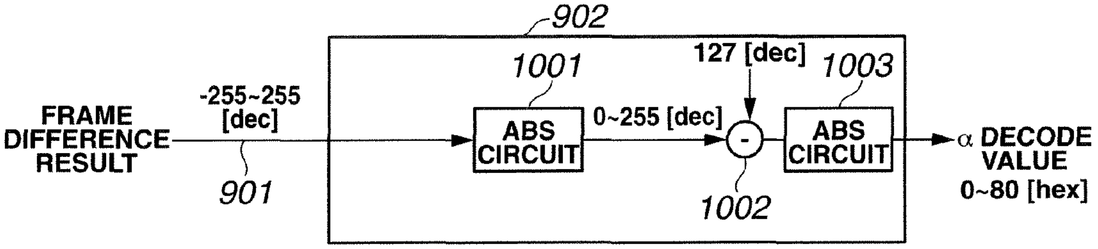
FIG. 14 is a block diagram of the α decode value generation circuit of FIG. 13.

Thus, FIG. 14 shows the concrete configuration of the α decode value generation circuit 902 in this embodiment.

In FIG. 14, the frame difference signal 901 takes the range of −255 to 255 [dec]. Consequently, the frame difference signal 901 is rendered as the absolute value by a first ABS circuit 1001 to take the form of 0 to 255 [dec]. Thereafter, 127 [dec] is subtracted by a difference device 1002 and rendered as the absolute value by a second ABS circuit 1003 so as to generate the α decode value which makes a transition to 0 to 128 [dec] centering on 127 [dec]. As previously described, the characteristic of the third embodiment as a difference from the first embodiment is the method of generating the α decode value of the α decode value generation circuit 902 whereby it is generated based on the frame difference signal 901. As the other operations are the same as the first embodiment, it is possible, according to the third embodiment, to automatically select the optimal α value from the frame difference signal 901 and suppress the over-highlight on a small circuit scale so as to realize higher image quality.

Here, the α value of this embodiment should also be set low if the frame difference signal 901 is around the intermediate level while the α value is set larger as the level goes away from the intermediate level.

Figure 15:
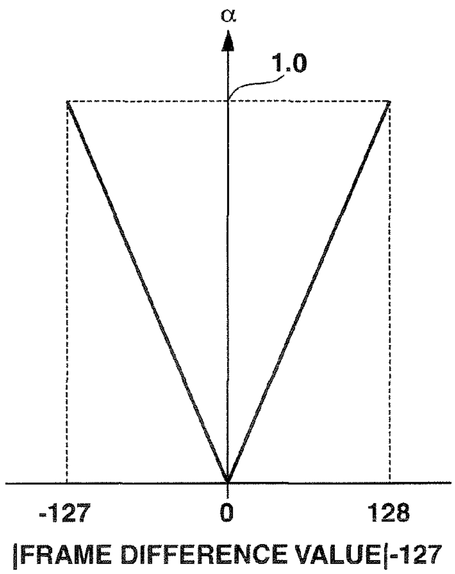
FIG. 15 is a diagram showing a relation between {|frame difference value|−127} [dec] equivalent to the α decode value and the α value of FIG. 14.

FIG. 15 shows a selection characteristic of the α value in the third embodiment. Therefore, the data rendered as the absolute value by the second ABS circuit 1003 can be represented as 0 to 128 [dec] centering on 127 (intermediate level). FIG. 15 shows the characteristic whereby the horizontal axis is |frame difference signal|−127 and the vertical axis is the α value.

Thus, this embodiment has the characteristic of allowing the α value to be set small around the intermediate level while the α value changes linearly according to the degree of going away from the intermediate level depending on the input video signal as with the characteristic shown in FIG. 15.

As previously described, according to this embodiment, the α decode value generation circuit 902 has the decoding function of setting the α value to the minimum value as a reference at the intermediate level of the difference signal and increasing and decreasing the α value according to the size of the difference value generated by the difference signal against the intermediate level. The α value can be decided based on the decode value by the α value selection circuit 105.

This embodiment assumes that the α value is linearly generated. As previously described, however, the α value depends on each individual panel characteristic so that it may also be a nonlinear characteristic matched to the panel characteristic.

Fourth Embodiment

Next, an image display adjusting device 100C according to a fourth embodiment of the present invention will be described with reference to FIGS. 16 to 19.

Figure 16:
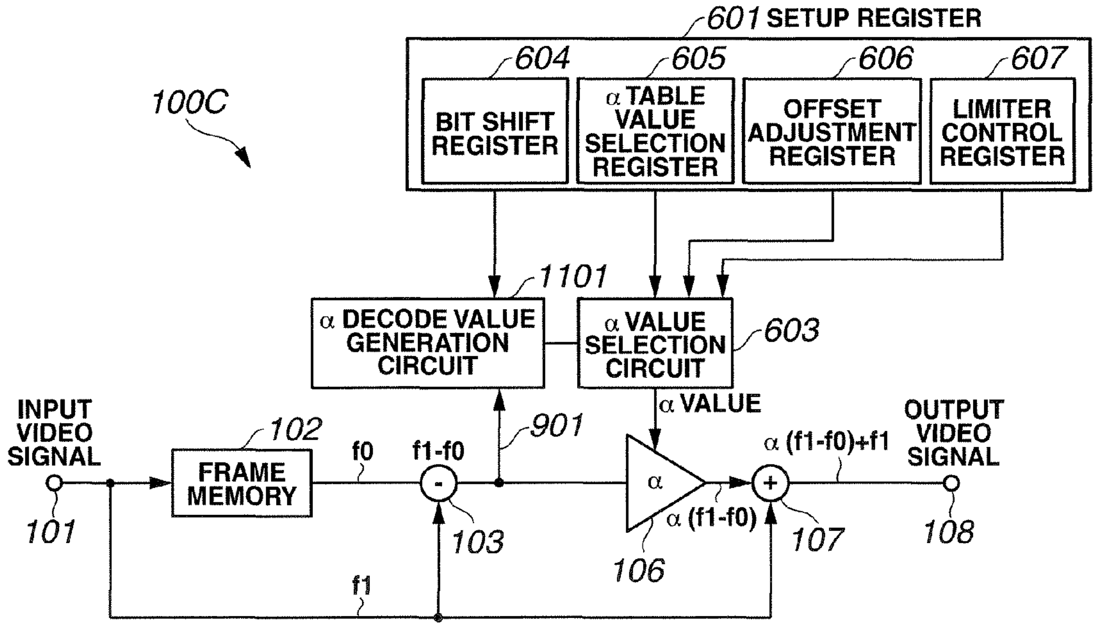
FIG. 16 is a block diagram of the image display adjusting device according to a fourth embodiment of the present invention.

FIG. 16 is a block diagram of the image display adjusting device according to the fourth embodiment of the present invention. The same portions as the previously described second embodiment of FIG. 6 will be given the same symbols and described. As with the second embodiment, FIG. 16 shows an example of using the setup register 601 including the bit shift register 604 and α table value selection register 605.

In FIG. 16, a major difference from the second embodiment of FIG. 6 is that the α decode value is generated from the frame difference signal 901 showing the difference result f1−f0 between the input video signal f1 and the video signal f0 of the immediately preceding frame as shown in the third embodiment of FIG. 13. Therefore, the configuration of the fourth embodiment is the same as the configuration of the second embodiment except that the configuration of an α decode value generation circuit 1101 is different from that in the second embodiment of FIG. 6. To be more specific, the fourth embodiment is configured by adding the setup register 601 for performing the same operation as the second embodiment of FIG. 6 to the α decode value generation circuit 902 and α value selection circuit 105 of the aforementioned third embodiment in FIG. 13.

The setup register 601 includes a bit shift register 604 for controlling the α decode value generation circuit 602, an α table value selection register 605 for controlling an α table value of the α value selection circuit 603, an offset adjustment register 606 for adjusting (that is, offsetting) the α value to a predetermined value between 0 and an upper limit (1 for instance) at the intermediate level of the input signal, and a limiter control register 607 for controlling the upper limit of the α value. The α decode value generation circuit 1101, α value selection circuit 603 and setup register 601 configure the highlight coefficient controlling portion.

The bit shift register 604, α table value selection register 605, offset adjustment register 606 and limiter control register 607 configuring the setup register 601 of this embodiment are configured by a latch circuit consisting of a flip-flop (FF) circuit hardware-wise as in the second embodiment so as to be implemented as the value set by software in an external microcomputer not shown is held by the latch circuit through a bus.

Next, details of the α decode value generation circuit 1101 of FIG. 16 will be described with reference to FIG. 17.

Figure 17:
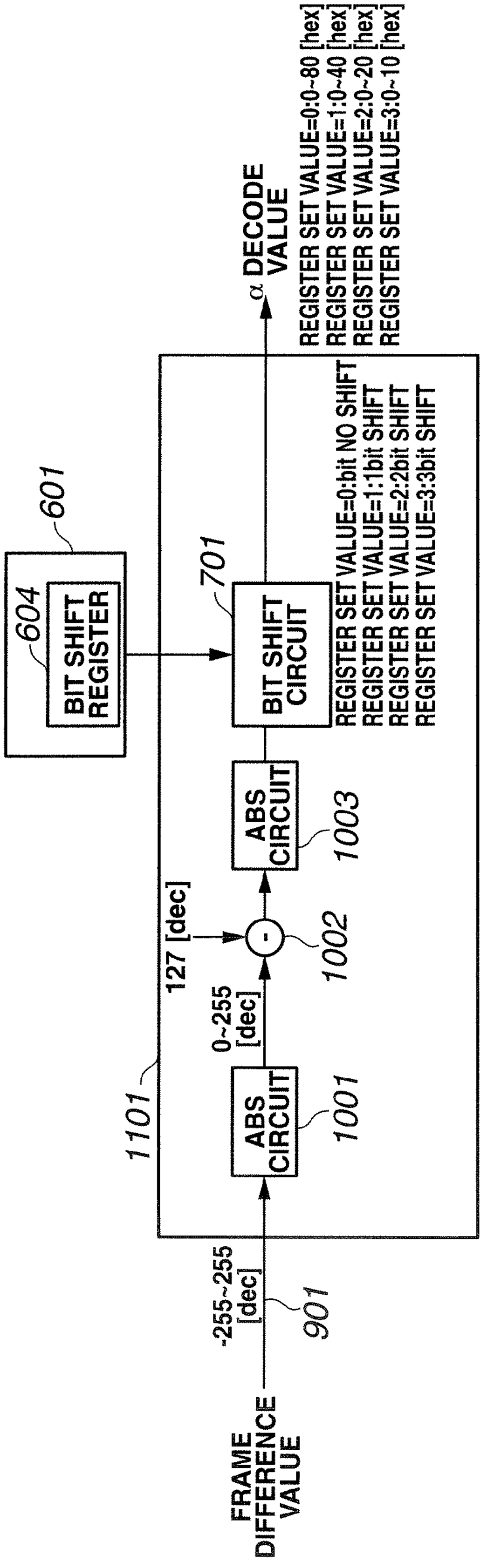
FIG. 17 is a block diagram of the α decode value generation circuit of FIG. 16.

FIG. 17 shows the configuration of the α decode value generation circuit 1101, which is configured by adding the setup register 601 and the bit shift circuit 701 for performing the same operation shown by the second embodiment of FIG. 6 to the α decode value generation circuit 902 of the aforementioned third embodiment in FIG. 12. Therefore, the α decode value generation circuit 1101 of FIG. 17 also has a configuration wherein it does not bit-shift when the value of the bit shift register 604=0, shifts 1 bit when the value of the bit shift register 604=1, shifts 2 bits when the value of the bit shift register 604=2, and shifts 3 bits when the value of the bit shift register 604=3. Such bit shift control causes the α decode value to perform the same operation as the second embodiment, such as (0 to 128 [dec]=0 to 80 [hex]) when not bit-shifting, (0 to 64 [dec]=0 to 40 [hex]) when shifting 1 bit, (0 to 32 [dec]=0 to 20 [hex]) when shifting 2 bits, and (0 to 16 [dec]=0 to 10 [hex]) when shifting 3 bits. Thus, allocation of the α values of the frame difference signal 901 is variable, and the general versatility of the α values can be enhanced on a small circuit scale.

Figure 18A:
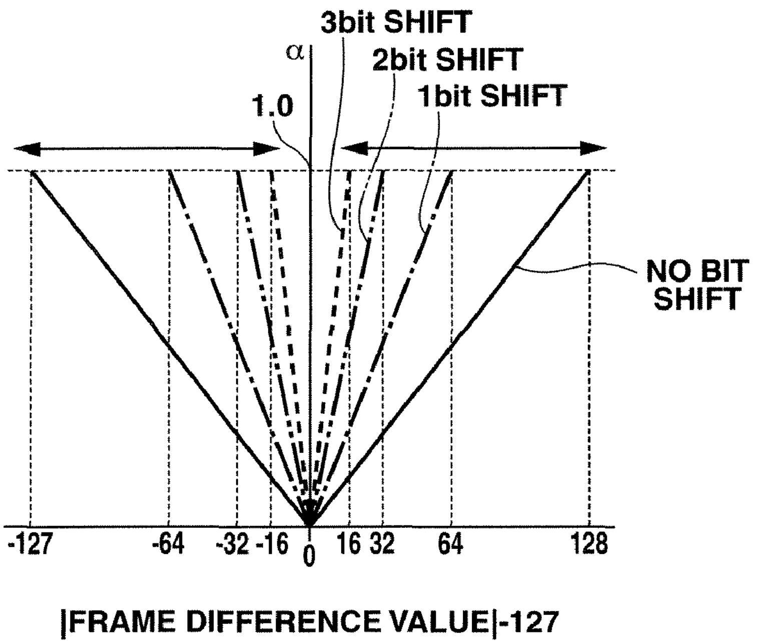
FIGS. 18A and 18B are characteristic diagrams showing a change characteristic of the α value by controlling the setup register according to the fourth embodiment of the present invention.
Figure 18B:
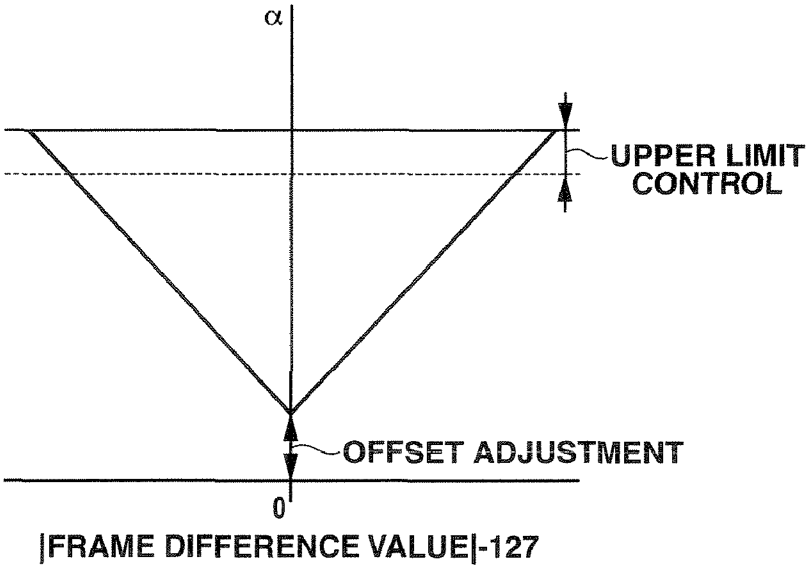

FIGS. 18A and 18B show the change characteristics of the α value by control of the setup register 601.

FIG. 18A shows the change characteristic of the α value when bit-shifting the α decode value by controlling the bit shift circuit 701 with the bit shift register 604. The horizontal axis is |frame difference signal|−127 equivalent to the decode value while the vertical axis shows the α value. It is possible, by rendering a set value of the bit shift register 604 larger, to render the range of the α decode value narrower as the bit shift value becomes larger so as to render the ratio of change in the α value against the α decode value larger, that is, coarser. It is also possible to render the range of the α decode value wider by setting the bit shift value smaller and thereby render the ratio of change in the α value against the α decode value smaller so as to allow a minute α value adjustment. As for the α table value selection register 605, it allows the α value selection circuit 603 including multiple α selection tables about the α decode values to specify the α selection table to be used when selecting the α value according to the inputted α decode value.

Figure 19:
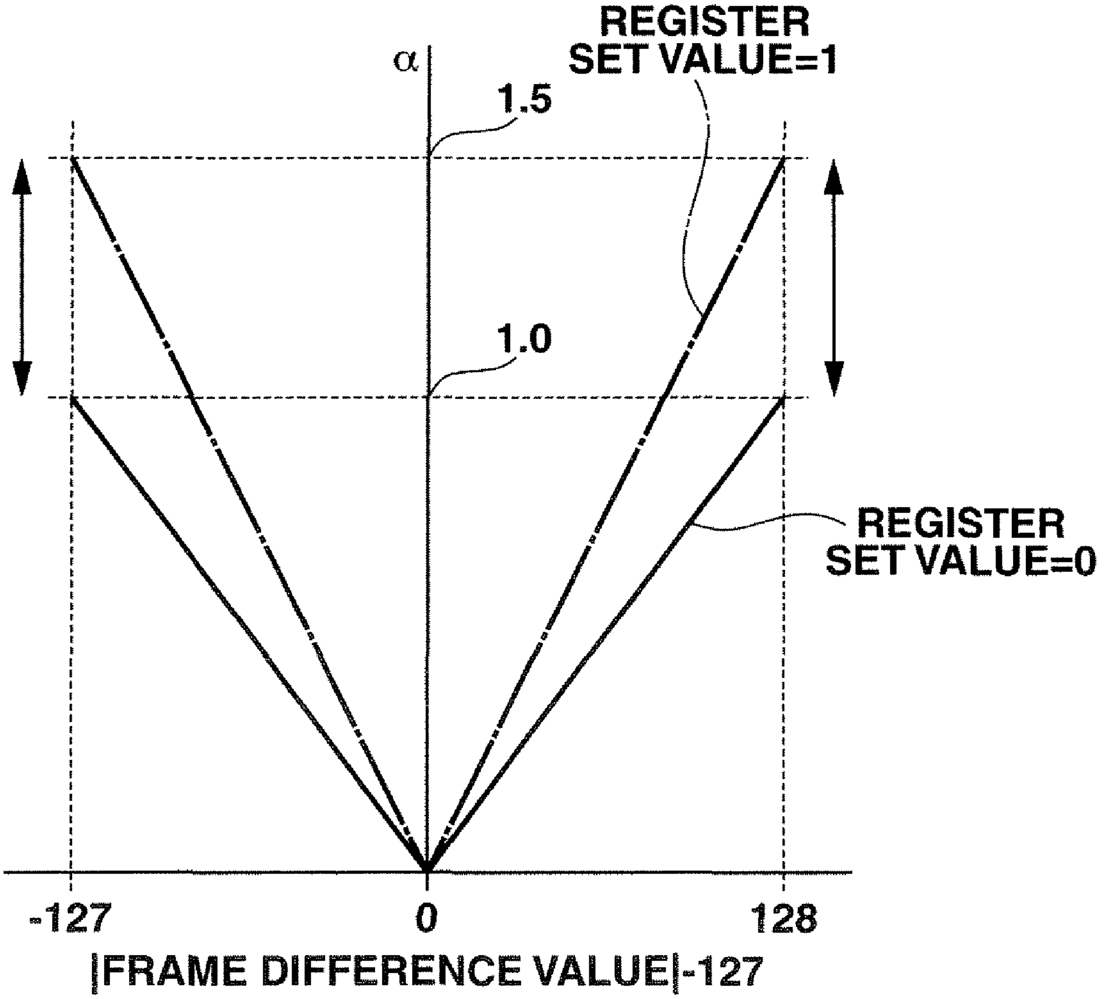
FIG. 19 is a characteristic diagram showing a change characteristic of the α value by selecting α table values from multiple α tables according to the fourth embodiment of the present invention.

FIG. 19 shows the change characteristic of the α value against the α decode value on changing the set value of the α table value selection register 605. It is the characteristic in the case where the range of the α decode value is fixed and the upper limit of the α value is changed.

Furthermore, it is also possible, as shown in FIG. 18B, to adjust the offset of the α value at the intermediate level and control the upper limit of the α value with the offset adjustment register 606 and limiter control register 607.

As previously described, the operation of this embodiment is the same as that of the second embodiment except that, as a characteristic of this embodiment, the α decode value generation circuit 1101 is generated by the frame difference signal 901. Therefore, according to this embodiment, it is also possible to automatically select the optimal α value from the frame difference signal 901 and enhance the general versatility of the α values on a small circuit scale so as to suppress the over-highlight and realize higher image quality as with the first embodiment.

Fifth Embodiment

Next, an image display adjusting device 100D according to a fifth embodiment of the present invention will be described with reference to FIGS. 20 to 23.

Figure 20:
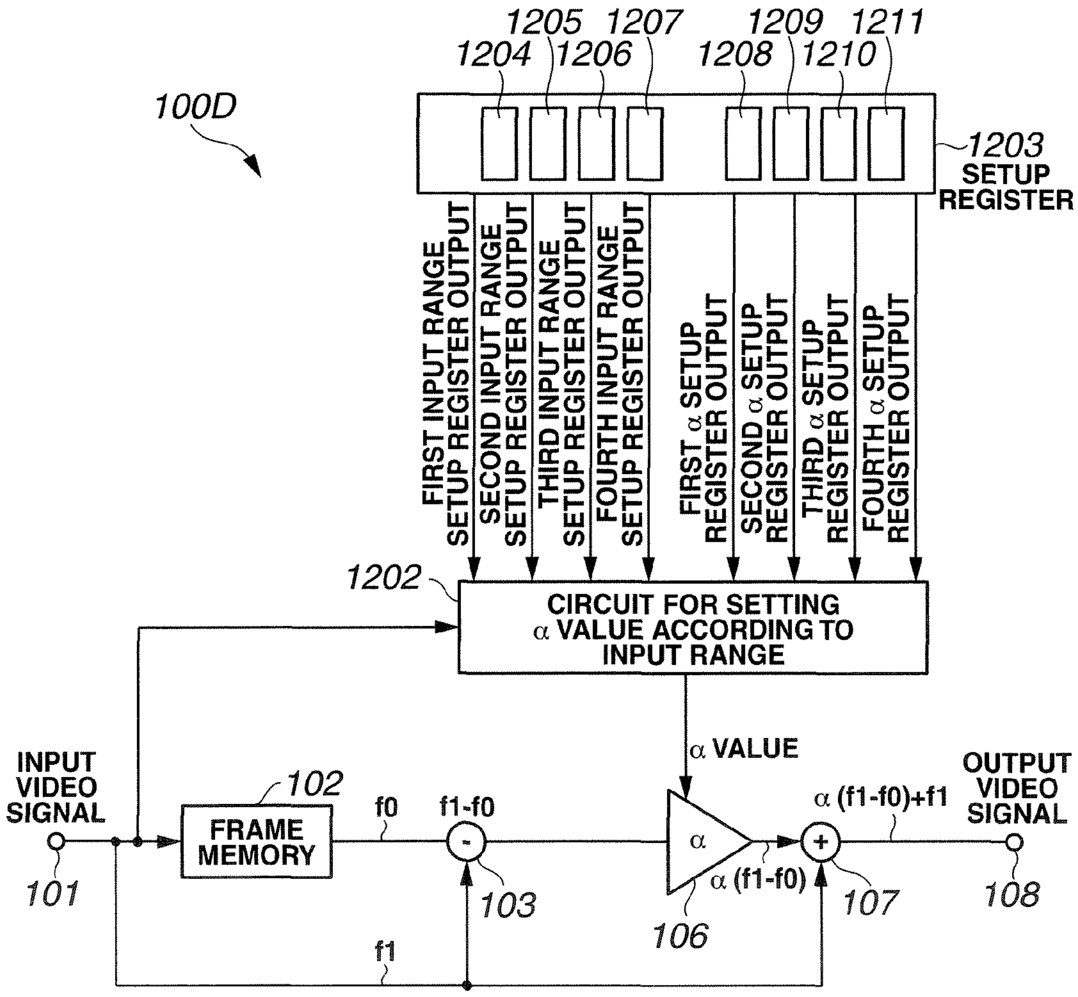
FIG. 20 is a block diagram of the image display adjusting device according to a fifth embodiment of the present invention.

FIG. 20 is a block diagram of the image display adjusting device according to the fifth embodiment of the present invention. It is different from the second embodiment of FIG. 6 in that the α decode value generation circuit 602 and α value selection circuit 603 of the second embodiment are rendered as a an α value setting circuit 1202 according to an input range, and a setup register 1203 provided to the α value setting circuit 1202 includes a first input range setup register 1204, a second input range setup register 1205, a third input range setup register 1206, a fourth input range setup register 1207, a first α setup register 1208, a second α setup register 1209, a third α setup register 1210 and a fourth α setup register 1211. The α value setting circuit 1202 according to the input range and setup register 1203 configure the highlight coefficient controlling portion.

The operation of the fifth embodiment will be described hereunder.

First, the input range of the input video signal to be inputted to an input terminal 101 is set up by the first input range setup register 1204 to the fourth input range setup register 1207 as shown in FIG. 21. Here, it shows an example of the case of setting up the first input range setup register 1204=63 [dec], the second input range setup register 1205=127 [dec], the third input range setup register 1206=191 [dec], the fourth input range setup register 1207=255 [dec] so as to acquire the input ranges as shown in FIG. 21. And the first α setup register 1208 to the fourth α setup register 1211 decide magnifications for setting the α values of the input ranges set up in FIG. 21 described above as shown in FIG. 22. Here, the first α setup register 1208 sets 0.5 [times] as to the input range 0 to 63 [dec], the second α setup register 1209 sets 0.1 [times] as to the input range 64 to 128 [dec], the third α setup register 1210 sets 0.1 [times] as to the input range 129 to 191 [dec], and the fourth α setup register 1211 sets 0.5 [times] as to the input range 192 to 255 [dec]. As described above, the α value of each individual input range is set by the α value setting circuit 1202 according to the input range.

Figure 23:
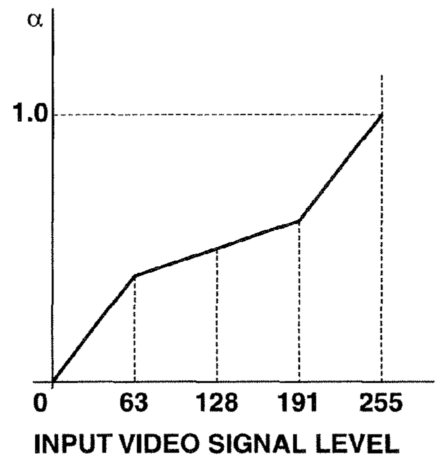
FIG. 23 is a characteristic diagram showing a change characteristic of the α value against a range of input video signal level [dec] equivalent to the α decode value according to the fifth embodiment of the present invention.

According to the aforementioned second embodiment of FIG. 6, the α value was automatically set by using the value set in the table with the input video signal inputted to an input terminal 101. According to the fifth embodiment, however, it is possible to set the input ranges from outside by using the first input range setup register 1204 to the fourth input range setup register 1207. And it is also possible to set the α value for each of the input ranges from outside by using the first α setup register 1208 to the fourth α setup register 1211. Thus, the general versatility of the α values and input ranges is enhanced as compared to the afore mentioned second embodiment so as to facilitate α value setting matched to the characteristic of each individual panel by varying the ratio of change in the α value according to the kind of liquid crystal panel or the characteristic difference (characteristic variation) of each individual liquid crystal panel. The first to fourth embodiments had a linear α characteristic as compared to the α decode value. According to the fifth embodiment, however, it is possible to address the range of the input video signal level with a nonlinear α characteristic as shown in FIG. 23.

As in the case of the second and fourth embodiments, the first input range setup register 1204 to the fourth input range setup register 1207 and the first α setup register 1208 to the fourth α setup register 1211 configuring the setup register 1203 are configured by a latch circuit consisting of a flip-flop (FF) circuit hardware-wise so as to be implemented as the value set by software in a microcomputer as control means not shown is held by the latch circuit through a bus.

The fifth embodiment has the four input ranges by way of example, and the number of the setup ranges may be increased to make it a system of higher accuracy.

The fifth embodiment has the configuration wherein the input ranges are set from the input video signals by the first input range setup register 1204 to the fourth input range setup register 1207 and the set values of α can be set accordingly by the first α setup register 1208 to the fourth α setup register 1211. Therefore, it is possible to suppress the over-highlight and realize higher image quality as with the aforementioned second embodiment. It is also possible to further enhance the general versatility of the α set values.

Sixth Embodiment

Next, an image display adjusting device 100E according to a sixth embodiment of the present invention will be described with reference to FIGS. 24 to 27.

Figure 24:
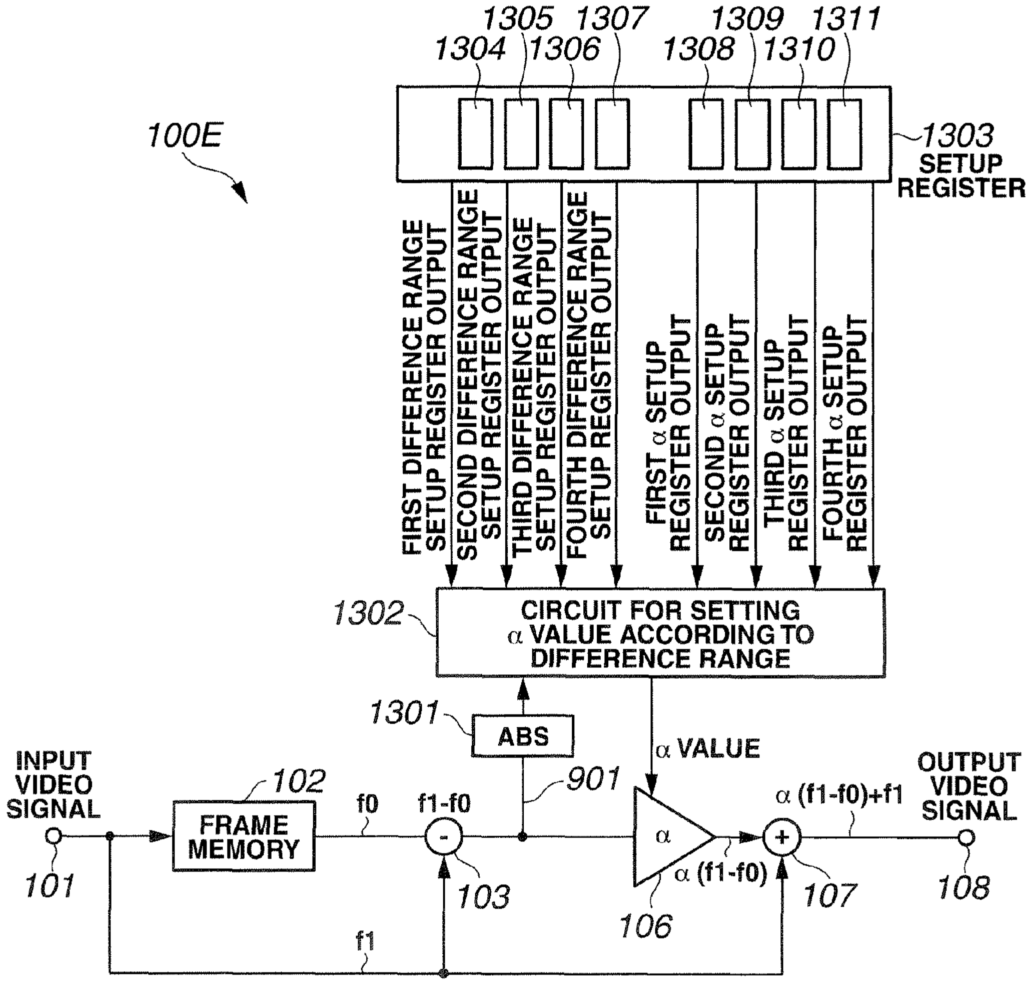
FIG. 24 is a block diagram of the image display adjusting device according to a sixth embodiment of the present invention.
Figure 28A:
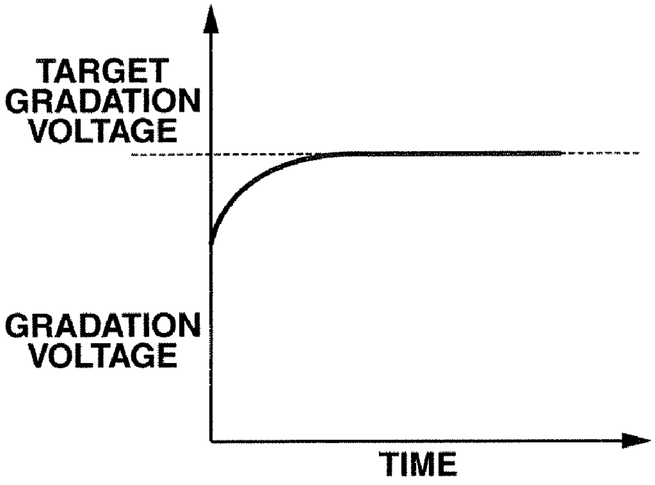
FIG.28A (PRIOR ART)
FIGS. 28A and 28B are explanatory diagrams of a conventional technique.
Figure 28B:
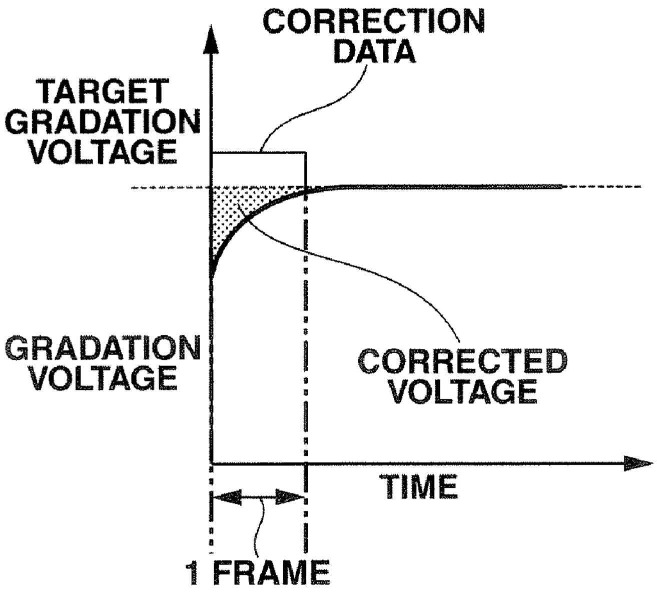
FIG.28B (PRIOR ART)

FIG. 24 is a block diagram of the image display adjusting device according to the sixth embodiment of the present invention. It is different from the aforementioned fourth embodiment in that the α decode value generation circuit 1101 and α value selection circuit 603 of the fourth embodiment are rendered as an α value setting circuit 1302 according to a difference range, and a setup register 1303 provided to the α value setting circuit 1302 includes a first difference range setup register 1304, a second difference range setup register 1305, a third difference range setup register 1306, a fourth difference range setup register 1307, a first α setup register 1308, a second α setup register 1309, a third α setup register 1310 and a fourth α setup register 1311. The α value setting circuit 1302 according to the difference range and the setup register 1303 configure the highlight coefficient controlling portion.

The operation of the sixth embodiment will be described hereunder.

First, the frame difference signal 901 is rendered as the absolute value by an ABS circuit 1301, and the difference range thereof is set up by the first difference range setup register 1304 to the fourth difference range setup register 1307 as shown in FIG. 25. Here, it shows an example of the case of setting up the first difference range setup register 1304=63 [dec], the second difference range setup register 1305=127 [dec], the third difference range setup register 1306=191 [dec], the fourth difference range setup register 1307=255 [dec] so as to acquire the difference ranges as shown in FIG. 25. And the first α setup register 1308 to the fourth α setup register 1311 decide setup magnifications for setting the α values of each difference range set up in FIG. 25 described above as shown in FIG. 26. Here, the first α setup register 1308 sets 0.5 [times] as to the difference range 0 to 63 [dec], the second α setup register 1309 sets 0.1 [times] as to the difference range 64 to 128 [dec], the third α setup register 1310 sets 0.1 [times] as to the difference range 129 to 191 [dec], and the fourth α setup register 1311 sets 0.5 [times] as to the input range 192 to 255 [dec]. As described above, the α value of each individual difference range is set by the α value setting circuit 1302 according to the difference range.

According to the aforementioned fourth embodiment of FIG. 16, the α value was automatically set by using the value set in the table with the frame difference signal 901. According to the sixth embodiment, however, it is possible to set the difference ranges from outside by using the first difference range setup register 1304 to the fourth difference range setup register 1307. And it is also possible to set the α value for each of the difference ranges from outside by using the first α setup register 1308 to the fourth α setup register 1311. Thus, the general versatility of the α values and difference ranges is enhanced further than the aforementioned fourth embodiment so as to facilitate the α value setting matched to the characteristic of each individual panel by varying the ratio of change in the α value according to the kind of liquid crystal panel or the characteristic difference (characteristic variation) of each individual liquid crystal panel. The first to fourth embodiments had a linear α characteristic as compared to the α decode value. According to the sixth embodiment, however, it is possible to address the range of frame difference values with a nonlinear α characteristic as shown in FIG. 27.

As in the case of the second, fourth and fifth embodiments, the first difference range setup register 1304 to the fourth difference range setup register 1307 and the first α setup register 1308 to the fourth α setup register 1311 configuring the setup register 1303 are configured by a latch circuit consisting of a flip-flop (FF) circuit hardware-wise so as to be implemented as the value set by software in a microcomputer as the control means not shown is held by the latch circuit through a bus.

The sixth embodiment has the four difference ranges by way of example, and the number of the setup ranges may be increased to make it a system of higher accuracy.

The sixth embodiment has the configuration wherein the difference ranges are set from the frame difference signal 901 by the first difference range setup register 1304 to the fourth difference range setup register 1307 and the set values of α can be set accordingly by the first α setup register 1308 to the fourth α setup register 1311. Therefore, it is possible to suppress the over-highlight and realize higher image quality as with the aforementioned fourth embodiment. It is also possible to further enhance the general versatility of the α set values.

According to the present invention described above, as for the highlight coefficient of an overdrive as one of the conventional methods of improving response characteristics, it is possible, with a display device of a slow response characteristic such as a large, medium or small liquid crystal display, to create an optimal highlight coefficient in a small scale circuit out of the difference value between the input video signal or the current input video signal and the signal of an immediately preceding frame. It is thereby possible to suppress degradation of image quality due to the over-highlight of the highlight coefficient as to any picture or any kind of liquid crystal panel. Therefore, the present invention can improve the response characteristics and realize image display of higher image quality on a small circuit scale.

The present invention is adaptable not only to the liquid crystal panel but also to the devices for performing various image display adjustments having the response characteristics.

Having described the preferred embodiments of the invention referring to the accompanying drawings, it should be understood that the present invention is not limited to those precise embodiments and various changes and modifications thereof could be made by one skilled in the art with out departing from the spirit or scope of the invention as defined in the appended claims.

What is claimed is:

1. An image display adjusting device comprising:

a memory portion configured to hold an input signal by one frame;

a difference portion configured to obtain a difference signal between the input signal preceding by one frame held by the memory portion and a current input signal;

a multiplication portion configured to multiply the difference signal from the difference portion by a highlight coefficient;

an addition portion configured to add an output signal of the multiplication portion to the current input signal; and a highlight coefficient controlling portion configured to perform predetermined decoding by inputting the input signal or the difference signal and converting it to a signal having a change characteristic different from that signal and to output the highlight coefficient adapted to the input signal or the difference signal by using that decode value.

2. The image display adjusting device according to claim 1, wherein the highlight coefficient controlling portion has a decoding function of setting a value of the highlight coefficient to a minimum value as a reference at a half-tone level of the input signal and increasing and decreasing the value of the highlight coefficient according to size of a difference value generated by the input signal against the half-tone level.

3. The image display adjusting device according to claim 1, wherein the highlight coefficient controlling portion has a decoding function of setting a value of the highlight coefficient to a minimum value as a reference at an intermediate level of the difference signal and increasing and decreasing the value of the highlight coefficient according to size of a difference value generated by the difference signal against the intermediate level.

4. The image display adjusting device according to claim 1, wherein the highlight coefficient controlling portion includes a setup register capable of adjusting the highlight coefficient from outside.

5. The image display adjusting device according to claim 1, wherein the highlight coefficient controlling portion includes a setup register capable of adjusting a range of the input signal or the difference signal from outside and sets the value of the highlight coefficient for multiple input ranges or difference ranges dividing the range with the setup register.

6. The image display adjusting device according to claim 1, wherein the highlight coefficient controlling portion comprises:

a decode value generation circuit configured to perform predetermined decoding to convert the input signal to a signal having a change characteristic different from that signal and to generate a decode value; and a highlight coefficient selection circuit configured to select and output the highlight coefficient adapted to the input signal by using the decode value from the decode value generation circuit.

7. The image display adjusting device according to claim 6, wherein the decode value generation circuit comprises:

a difference device configured to take a difference between the input signal and a half-tone level of the input signal; and an absolute value circuit configured to render difference data from the difference device as an absolute value and to output it as the decode value.

8. The image display adjusting device according to claim 1, wherein:

the highlight coefficient controlling portion comprises:

a decode value generation circuit configured to perform predetermined decoding to convert the input signal to a signal having a change characteristic different from that signal and to generate a decode value;

a highlight coefficient selection circuit configured to select and output the highlight coefficient adapted to the input signal by using the decode value from the decode value generation circuit;

a setup register capable of adjusting the highlight coefficient from outside, and the decode value generation circuit comprises:

a difference device configured to take a difference between the input signal and a half-tone level of the input signal; and an absolute value circuit configured to render difference data from the difference device as an absolute value and to output it as the decode value; and a bit shift circuit configured to bit-shift the absolute value from the absolute value circuit and to output it as the decode value, and the setup register comprises:

a bit shift register configured to control the bit shift circuit of the decode value generation circuit; and a table value selection register configured to select an appropriate table from multiple highlight coefficient tables held by the highlight coefficient selection circuit.

9. The image display adjusting device according to claim 8, wherein the setup register comprises at least one of:

an offset adjustment register configured to adjust the highlight coefficient to a predetermined value between 0 and an upper limit at the half-tone level of the input signal; and a limiter control register configured to control the upper limit of the highlight coefficient.

10. The image display adjusting device according to claim 1, wherein the highlight coefficient controlling portion comprises:

a decode value generation circuit configured to perform predetermined decoding to convert the difference signal to a signal having a change characteristic different from that signal and to generate a decode value; and a highlight coefficient selection circuit configured to select and to output the highlight coefficient adapted to the difference signal by using the decode value from the decode value generation circuit.

11. The image display adjusting device according to claim 10, wherein the decode value generation circuit comprises:

a first absolute value circuit configured to input the difference signal and to render it as an absolute value;

a difference device configured to take a difference between an absolute value signal from the first absolute value circuit and an intermediate level of the absolute value signal; and a second absolute value circuit configured to render difference data from the difference device as an absolute value and to output it as a decode value.

12. The image display adjusting device according to claim 1, wherein:

the highlight coefficient controlling portion comprises:

a decode value generation circuit configured to perform predetermined decoding to convert the difference signal to a signal having a change characteristic different from that signal and to generate a decode value;

a highlight coefficient selection circuit configured to select and to output the highlight coefficient adapted to the difference signal by using the decode value from the decode value generation circuit; and a setup register capable of adjusting the highlight coefficient from outside, the decode value generation circuit comprises:

a difference device configured to take a difference between the difference signal and an intermediate level of the difference signal; and an absolute value circuit configured to render difference data from the difference device as an absolute value and to output it as the decode value; and a bit shift circuit configured to bit-shift the absolute value from the absolute value circuit and to output it as the decode value, and the setup register comprises:

a bit shift register configured to control the bit shift circuit of the decode value generation circuit; and a table value selection register configured to select an appropriate table from multiple highlight coefficient tables held by the highlight coefficient selection circuit.

13. The image display adjusting device according to claim 12, wherein the setup register comprises at least one of:

an offset adjustment register configured to adjust the highlight coefficient to a predetermined value between 0 and an upper limit at the intermediate level of the difference signal; and a limiter control register configured to control the upper limit of the highlight coefficient.

14. The image display adjusting device according to claim 1, wherein the highlight coefficient controlling portion comprises:

a highlight coefficient setting circuit configured to divide a range of the input signal into multiple input ranges and to set the value of the highlight coefficient for each individual input range;

multiple input range setup registers configured to set up the multiple input ranges;

multiple highlight coefficient setup registers configured to decide magnifications for setting the values of the highlight coefficients according to the input ranges set up by the multiple input range setup registers.

15. The image display adjusting device according to claim 1, wherein the highlight coefficient controlling portion comprises:

a highlight coefficient setting circuit configured to divide a range of the difference signal into multiple difference ranges and to set the value of the highlight coefficient for each individual difference range;

multiple difference range setup registers configured to set up the multiple difference ranges; and multiple highlight coefficient setup registers configured to decide magnifications for setting values of the highlight coefficients according to each of the difference ranges set up by the multiple difference range setup registers.

16. The image display adjusting device according to claim 4, wherein the setup register is configured by a latch circuit comprising a flip-flop circuit and a value set by software in a microcomputer is held by the latch circuit through a bus.

17. The image display adjusting device according to claim 5, wherein the setup register is configured by a latch circuit comprising a flip-flop circuit and a value set by software in a microcomputer is held by the latch circuit through a bus.

18. The image display adjusting device according to claim 1, wherein the input signal is a video signal configured to display and drive a liquid crystal panel.

19. An image display adjusting device including:

a memory portion configured to hold an input signal by one frame;

a difference portion configured to obtain a difference signal between the input signal preceding by one frame held by the memory portion and a current input signal;

a multiplication portion configured to multiply the difference signal from the difference portion by a highlight coefficient;

an addition portion configured to add an output signal of the multiplication portion to the current input signal; and a highlight coefficient controlling portion configured to perform predetermined decoding by inputting the input signal or the difference signal and converting it to a signal having a change characteristic different from that signal and to output the highlight coefficient adapted to the input signal or the difference signal by using that decode value, the highlight coefficient controlling portion having a setup register capable of adjusting the highlight coefficient from outside.

20. An image display adjusting device including:

a memory portion configured to hold an input signal by one frame;

a difference portion configured to obtain a difference signal between the input signal preceding by one frame held by the memory portion and a current input signal;

a multiplication portion configured to multiply the difference signal from the difference portion by a highlight coefficient;

an addition portion configured to add an output signal of the multiplication portion to the current input signal; and a highlight coefficient controlling portion configured to perform predetermined decoding by inputting the difference signal and to convert it to a signal having a change characteristic different from that signal and to output the highlight coefficient adapted to the difference signal by using that decode value, the highlight coefficient controlling portion having a setup register capable of adjusting a range of the difference signal from outside and to set the value of the highlight coefficient for multiple difference ranges dividing the range with the setup register, the highlight coefficient controlling portion further having a setup register capable of adjusting a range of the input signal or the difference signal from outside and setting the value of the highlight coefficient for multiple input ranges or difference ranges dividing the range with the setup register.

* * * * *